(12) United States Patent
Noguchi et al.

(10) Patent No.: US 7,469,985 B2
(45) Date of Patent: Dec. 30, 2008

(54) DATA PROCESSING APPARATUS, PRINTING APPARATUS AND METHOD OF CREATING MASK

(75) Inventors: Eri Noguchi, Yokohama (JP); Yoshitomo Marumoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/697,880

(22) Filed: Apr. 9, 2007

(65) Prior Publication Data

US 2007/0236525 A1 Oct. 11, 2007

(30) Foreign Application Priority Data

Apr. 11, 2006 (JP) ............... 2006-108907

(51) Int. Cl.
*B41J 2/205* (2006.01)
(52) U.S. Cl. ............... 347/15; 358/1.2; 358/1.9
(58) Field of Classification Search ............. 347/15, 347/43, 41; 358/1.2, 1.9, 3.01–3.03
See application file for complete search history.

(56) References Cited

U.S. PATENT DOCUMENTS

| 6,601,939 | B2 | 8/2003 | Fujita et al. | 347/15 |
| 7,031,021 | B1 * | 4/2006 | Lain et al. | 358/1.9 |
| 2002/0149635 | A1 * | 10/2002 | Askeland et al. | 347/9 |

FOREIGN PATENT DOCUMENTS

| JP | 2002-144552 | 5/2002 |
| JP | 2005-197873 | 7/2005 |
| JP | 2005-262788 | 9/2005 |

OTHER PUBLICATIONS

T. Mitsa, et al., "Digital Halftoning Using A Blue Noise Mask", SPIE 1452, 1991, pp. 47-56.
R. Dooley, "Predicting Brightness Appearance at Edges Using Linear and Non-Linear Visual Describing Functions", Proc. SPSE Annual Meeting, p. 167 (1975).

* cited by examiner

*Primary Examiner*—Lamson D Nguyen
(74) *Attorney, Agent, or Firm*—Fitzpatrick, Cella, Harper & Scinto

(57) ABSTRACT

Beading caused by interferences between block patterns, which are driving patterns of two nozzle arrays at the time of printing with the use of the two nozzle arrays for the same color, and a mask is reduced. Specifically, when the mask is created, repulsive potentials are calculated between the mask and planes with the block patterns. That is, when a placement of a print permitting area in the mask is determined, the repulsive potentials are calculated between the mask and dots in the planes with the block patterns, and then the print permitting area is placed on the most dispersive position with the lowest energy. This allows the print permitting areas to be well dispersed in terms of the overlaps between the block patterns and the mask.

20 Claims, 28 Drawing Sheets

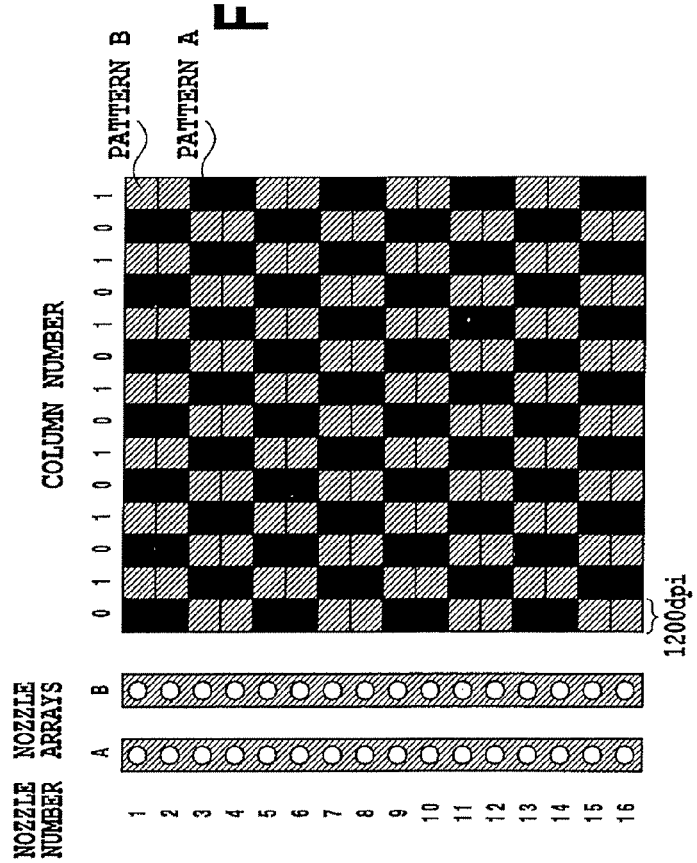
FIG.13B
FIG.13C
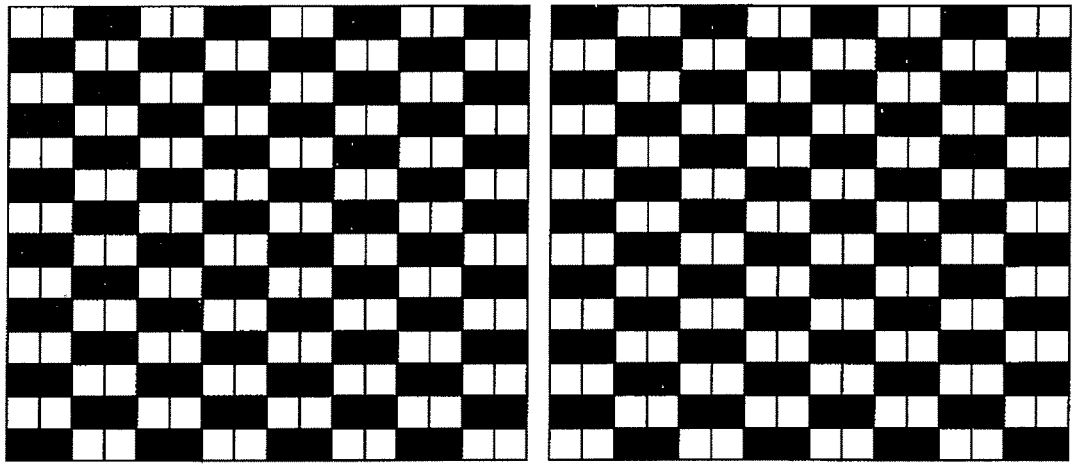
FIG.13A

M1

Y1

C1 × BLOCK PATTERN A

C1 × BLOCK PATTERN B

M1 × BLOCK PATTERN A

M1 × BLOCK PATTERN B

Y1 × BLOCK PATTERN A

Y1 × BLOCK PATTERN B

DATA PROCESSING APPARATUS, PRINTING APPARATUS AND METHOD OF CREATING MASK

BACKGROUND OF THE INVENTION

1. Field of the Invention

The present invention relates to a data processing apparatus, a printing apparatus, and a method of creating a mask. More particularly, the present invention relates to a dot data generation processing for dividing dot data with the use of a mask into respective dot data to be used for a plurality of times of scanning of a print head, and based on the divided dot data, performing printing with the use of a plurality of arrays of printing elements or a plurality of heads, in regard to printing elements for the same color.

2. Description of the Related Art

With the diffusion of information processing equipment such as personal computers in recent years, printing apparatuses as image forming terminals have also been rapidly developing and diffusing. Of those various printing apparatuses, an ink jet printing apparatus that executes ink ejection to perform printing on a print medium such as paper, cloth, plastic sheet and OHP sheet in particular has become mainstream in regard to personal use. And this is because such an ink jet printing apparatus has excellent advantages such as being of low-noise and non-impact type printing, high-density and high-speed printing operations, easy adaptable for color printing, and of low-cost.

Advances in ink jet printing technique have been facilitated image quality improvement, faster and more economical printing, thereby contributing to the diffusion of printing apparatuses into personal users. The diffusion of personal computers and digital cameras has also contributed to the diffusion of printing apparatuses. These digital cameras include the digital camera that functions alone, as well as the digital camera that is integrated into other device, for example a mobile phone. Due to such extensive diffusion, personal users have also been requiring more improvement of image quality. Particularly, in recent years, a print system in which photographs can be readily printed at home and the printed result has an image quality comparable to silver salt photographs have been required.

In ink jet printing apparatuses, granularity has so far been seen as a problem when compared to silver salt photographs. Various measures have been proposed in order to reduce such granularity. For example, known is an ink jet printing apparatus equipped with an ink system in which light cyan and light magenta whose color material concentration are lower are added to regular cyan, magenta, yellow and black. In such an ink jet printing apparatus, the granularity can be reduced by using ink such as light cyan and light magenta in a low image density region. Meanwhile, in a high image density region, a wider color reproduction range and smooth gradation can be realized by using regular cyan and magenta inks when printing. There is another method for reducing the granularity by designing smaller size of dots to be formed on a print medium. This can be generally realized by reducing the volume of an ink droplet to be ejected from an ejection opening of a print head. In this case, it is possible to print a high resolution image without reducing printing speed by reducing the volume of ink droplets as well as having more ejection opening at higher arrangement density.

On the other hand, high-image-quality and high-speed printing capabilities are also requirement of recent printing apparatuses. As a configuration for realizing such capabilities, a printing method in which a plurality of nozzle arrays are provided for ink of one color is described in Japanese Patent Laid-open No. 2005-262788. FIG. 1A shows a print head for the case where printing is performed with a single nozzle array provided for ink of one color. On the other hand, FIG. 1B shows a print head used for the case where printing is performed with two nozzle arrays provided for ink of one color. In addition, in these Figures, each nozzle array is shown as being composed of 16 nozzles, for illustrative simplicity. If an image, which should be printed with the a single nozzle array shown in FIG. 1A, is printed with the two nozzle arrays shown in FIG. 1B, the scanning speed of the nozzle arrays can be doubled and thereby the printing speed can be doubled even if a driving frequency for each of the two nozzle arrays is the same as in the case where printing is performed with the single nozzle array. Also, in the case where the two nozzle arrays shown in FIG. 1B are used, the number of times a print head for printing is used for a certain area, for example, a region for one scanning, is halved in comparison with the single array case shown in FIG. 1A, and thereby extends the lifetime of the print head.

A process for distributing dot data to a plurality of nozzle arrays such as two or more arrays is performed by, for example the configuration shown in FIG. 2. FIG. 2 shows the configuration from the step of dividing image (dot) data for so-called multi-pass printing to the step of performing printing by driving a print head based on the divided dot data. In FIG. 2, the image (dot) data input in step 201 is subject to mask processing in step 202 to generate the dot data for each of a plurality of times of scanning. Then, in step 203, the divided dot data for each scanning is allocated to the nozzles of each nozzle array. The allocation of the dot data to the nozzle arrays is performed according to predetermined patterns. The patterns are referred to as "block patterns" or "driving patterns" in the present specification.

FIG. 3 is a schematic diagram illustrating particularly the block patterns (driving patterns) for allocating ejection data to two nozzle arrays.

The example illustrated in the diagram shows that each of two nozzle arrays A and B that eject ink of the same color comprises 16 nozzles arranged vertically in the diagram at intervals corresponding to 1200 dpi. Also, the image to be printed is a solid image (an image in which all the areas (area: a unit region to be printed with an ink dot) are printed with ink dots) with a resolution of 1200 dpi. Furthermore, the driving frequency for each nozzle of the nozzle arrays A and B is intended for one ejection at area intervals corresponding to 600 dpi. In addition, in the case of multi-pass printing, the image to be allocated to the two nozzle arrays is a divided image correspondingly to each of a plurality of times of scanning. Regarding the above solid image, in each scanning, ink dots are printed on areas corresponding to a division ratio based on the number of times of scanning; however, in the following description with reference to FIG. 3, the case where the solid image is printed in one scanning is described as an example for descriptive simplicity.

In FIG. 3, dot data is allocated to the nozzle arrays A and B based on the block patterns A and B, respectively. Specifically, when the column (a vertical area array in the diagram) 0 is printed, nozzles with nozzle numbers {1, 2}, {5, 6, 7}, {9, 10} and {14} are used in the nozzle array A, and those with nozzle numbers {3, 4}, {8}, {11, 12, 13} and {15, 16} are used in the nozzle array B. When the column 1 is printed, nozzles exclusive of (complement to) those used for the column 0 are used for printing in both of nozzle arrays A and B. In addition, if n nozzle arrays, where n is 3 or more, are used, it should be appreciated that patterns are complemented by n columns. Also, the example illustrated in FIG. 3 shows that a plurality of nozzle arrays for ink of the same color are configured as one head. However, it should be appreciated that the above description is also applicable even if each nozzle array is configured as one head and a plurality of print heads are used for ink of the same color.

As described, even if each nozzle is driven with the driving frequency corresponding to one ejection at 600 dpi intervals, driving equivalent to that with the driving frequency corresponding to one ejection at 1200 dpi intervals can be achieved, so that printing of a high-resolution image can be achieved without reducing printing speed.

Meanwhile, if a printing speed is increased in general, for example, if a printing configuration in which a plurality of nozzle arrays such as the above 2 nozzle arrays are provided and a printing speed is increased by several times without the change in driving frequency is employed, a problem of beading in a printed image may arise.

That is, the increase in speed causes the increase in an amount of ink applied to a unit area of a printing medium per unit time. In such a case, although the printing medium may eventually absorb a total amount of the ink applied depending on a type of the printing medium, the absorption may not be able to follow the applying speed, and therefore ink droplets, which have not been absorbed at the surface of the printing medium, may come into contact with each other during printing. Then, a relatively increased size of ink droplet caused by combination due to the contact may become highly visible on a resulting image to thereby reduce image quality.

For example, it is considered that a blue image represented by cyan ink and magenta ink is printed onto a printing medium by multi-pass printing of two-pass. A serial type printing apparatus performs scanning with a print head in which nozzle arrays, for example, for 4 colors of cyan, magenta, yellow and black, are arranged for printing. During the scanning, the inks are ejected onto the same region of the printing medium from the respective nozzle arrays. In the case of printing the blue image, the cyan ink and the magenta ink based on dot data obtained by thinning image data for cyan and magenta into ½ respectively are applied onto the printing medium with a relatively short time difference in the same scanning. At this time, if the cyan ink and the magenta ink are applied onto the same area or adjacent areas, both are attracted each other by their surface tensions and therefore a large lump (hereinafter also referred to as a grain) of ink having the size of the two ink droplets (or more) is formed. Once such a grain is formed, ink applied to the position adjacent to the grain is likely to be attracted by the grain. That is, the first generated grain serves as a nucleus and gradually grows, and eventually a large grain is formed. As a result, such a grain itself or the presence of such grains that are irregularly distributed causes an adverse effect on an image, which is called "beading".

Such a grain is not generated only by the surface tensions of ink droplets. For example, if inter-reactive printing liquids are applied in the same scanning, the contacted liquids are combined by a strong chemical reaction, which may cause the formation of a grain nucleus.

Various printing methods and mask patterns for preventing the beading have conventionally been proposed. Japanese Patent Laid-open No. 2002-144552 describes the use of a mask that is configured to improve the dispersibility in an arrangement of dots that is printed with one scanning of a nozzle array for ink of one color. According to this, the grain formation by the contact of ink droplets of the same color printed in one scanning can be decreased.

In Japanese Patent Laid-open No. 2002-144552, the dispersibility of dots in one plane printed by a nozzle array for ink of one color in one scanning is considered; however, dispersibility in relation to dots in another plane is not considered. For this reason, dispersibility in relation to, for example, dots in another color plane printed in the same scanning or dots in a plane printed in another scanning, is poor, which may cause grains.

The inventors of the present invention have found that such a problem of the dot dispersibility between different planes is applicable to that between the above-described dot arrangement by each block pattern when printed with a plurality of nozzle arrays for the same color and the dot arrangement by a mask.

FIGS. 4(a) to (e) are diagrams for explaining this problem. A pattern (a) shows image (dot) data 401 for one color to be printed. The dot data 401 is data for one scanning out of data for a plurality of scanning into which a mask divides.

Patterns (b) and (c) respectively illustrate block patterns 402 and 403 for the case where printing is performed with two nozzle arrays A and B as shown in FIG. 3. When the nozzle arrays A and B are driven based on the block patterns 402 and 403, the dot data 401 is printed as dot arrangement patterns 404 and 405 shown in patterns (d) and (e) respectively.

It is obvious from the patterns (d) and (e) that the dot pattern generated by the mask and each of the block patterns interfere with each other and therefore the nozzles of one of the two arrays are more used. Such uneven use of the nozzles is likely to result in poor dispersibility of printed dots to thereby cause beading due to the above-described grains. Thus, if the interferences in dot positions between the mask and a plurality of planes with a plurality of block patterns are present, the dispersibility in a dot arrangement of an image to be eventually printed may become poor, causing the problem of beading.

SUMMARY OF THE INVENTION

An object of the present invention is to provide a data processing apparatus, a printing apparatus, and a method of creating a mask that are capable of reducing the beading caused by the interference between a block pattern, which is a driving pattern for each nozzle array at the time of printing with the use of a plurality of nozzle arrays for the same color, and a mask.

In the first aspect of the present invention, there is provided a data processing apparatus that generates data used for performing printing by a plurality times of scanning of a plurality of nozzle arrays for printing dots of a predetermined color, to a same region of a printing medium, said apparatus comprising: means for executing mask processing for dot data of the predetermined color by using mask patterns, in order to divide the dot data of the predetermined color to be printed to the same region into dot data used for each of the plurality times of scanning; and means for allocating the dot data that has been subjected to the mask processing to the plurality of nozzle arrays in accordance with respective driving patterns for respective nozzle arrays, the respective driving patterns having driving permitting areas and driving non-permitting areas, wherein the mask pattern has a characteristics that frequency components of a low frequency region in a logical product pattern, which is obtained by a logical product operation of an arrangement of the print permitting areas in the mask pattern and an arrangement of driving permitting areas in the driving pattern for each of the plurality of nozzle arrays, are fewer than that of a high frequency region, and peaks of the frequency components do not exist in a region lower side of half of the low frequency region.

In the second aspect of the present invention, there is provided a data processing apparatus that generates data used for performing printing by a plurality times of scanning of a plurality of nozzle arrays for printing dots of a predetermined color, to a same region of a printing medium, said apparatus comprising: means for executing mask processing for dot data of the predetermined color by using mask patterns, in order to divide the dot data of the predetermined color to be printed to the same region into dot data used for each of the plurality times of scanning; and means for allocating the dot data that has been subjected to the mask processing to the plurality of nozzle arrays in accordance with respective driving patterns for respective nozzle arrays, the respective driving patterns having driving permitting areas and driving non-permitting areas, wherein the mask pattern has a characteristics that frequency components of a low frequency region in a logical product pattern, which is obtained by a logical product operation of an arrangement of the print permitting areas in the mask pattern and an arrangement of driving permitting areas in the driving pattern for each of the plurality of nozzle arrays, are fewer than that of a high frequency region, and peaks of the frequency components do not exist in a region lower side of one-fourth of the low frequency region.

In the third aspect of the present invention, there is provided a data processing apparatus that generates data used for performing printing by a plurality times of scanning of a plurality of nozzle arrays for printing dots of a predetermined color, to a same region of a printing medium, said apparatus comprising: means for executing mask processing for dot data of the predetermined color by using mask patterns, in order to divide the dot data of the predetermined color to be printed to the same region into dot data used for each of the plurality times of scanning; and means for allocating the dot data that has been subjected to the mask processing to the plurality of nozzle arrays in accordance with respective driving patterns for respective nozzle arrays, the respective driving patterns having driving permitting areas and driving non-permitting areas, wherein the mask pattern has a characteristics that frequency components of a low frequency region in a logical product pattern, which is obtained by a logical product operation of an arrangement of the print permitting areas in the mask pattern and an arrangement of driving permitting areas in the driving pattern for each of the plurality of nozzle arrays, are fewer than that of a high frequency region, and peaks of the frequency components do not exist in a whole area of the low frequency region.

In the fourth aspect of the present invention, there is provided a printing apparatus that performs printing by a plurality times of scanning of a plurality of nozzle arrays for printing dots of a predetermined color, to a same region of a printing medium, said apparatus comprising: means for executing mask processing for dot data of the predetermined color by using mask patterns, in order to divide the dot data of the predetermined color to be printed to the same region into dot data used for each of the plurality times of scanning; and means for allocating the dot data that has been subjected to the mask processing to the plurality of nozzle arrays in accordance with respective driving patterns for respective nozzle arrays, the respective driving patterns having driving permitting areas and driving non-permitting areas, wherein the mask pattern has a characteristics that frequency components of a low frequency region in a logical product pattern, which is obtained by a logical product operation of an arrangement of the print permitting areas in the mask pattern and an arrangement of driving permitting areas in the driving pattern for each of the plurality of nozzle arrays, are fewer than that of a high frequency region, and peaks of the frequency components do not exist in a region lower side of half of the low frequency region.

In the fifth aspect of the present invention, there is provided a method of creating mask patterns used in mask processing in a data processing apparatus that generates data used for performing printing by a plurality times of scanning of a plurality of nozzle arrays for printing dots of a predetermined color, to a same region of a printing medium, the data processing apparatus allocating the dot data that has been subjected to the mask processing to the plurality of nozzle arrays in accordance with respective driving patterns for respective nozzle arrays, the respective driving patterns having driving permitting areas and driving non-permitting areas, and generating dot data for driving nozzles of the plurality of nozzle arrays based on the allocated dot data, said method comprising: a determining step of determining an arrangement of print permitting areas in the mask pattern, wherein said determining step includes a step of determining the arrangements of print permitting areas so that a logical product pattern obtained by a logical product operation of the arrangement of the print permitting areas in the mask pattern and an arrangement of driving permitting areas in each of the driving patterns for each of nozzle arrays has a characteristic that low frequency components of the logical product pattern are decreased.

In the sixth aspect of the present invention, there is provided a data processing method for generating data used for performing printing by a plurality times of scanning of a plurality of nozzle arrays for printing dots of a predetermined color, to a same region of a printing medium, said method comprising: a step of executing mask processing for dot data of the predetermined color by using mask patterns, in order to divide the dot data of the predetermined color to be printed to the same region into dot data used for each of the plurality times of scanning; and step of allocating the dot data that has been subjected to the mask processing to the plurality of nozzle arrays in accordance with respective driving patterns for respective nozzle arrays, the respective driving patterns having driving permitting areas and driving non-permitting areas, wherein the mask pattern has a characteristics that frequency components of a low frequency region in a logical product pattern, which is obtained by a logical product operation of an arrangement of the print permitting areas in the mask pattern and an arrangement of driving permitting areas in the driving pattern for each of the plurality of nozzle arrays, are fewer than that of a high frequency region, and peaks of the frequency components do not exist in a region lower side of half of the low frequency region.

In the seventh aspect of the present invention, there is provided a data processing method that generates data used for performing printing by a plurality times of scanning of a plurality of nozzle arrays for printing dots of a predetermined color, to a same region of a printing medium, said method comprising: step of executing mask processing for dot data of the predetermined color by using mask patterns, in order to divide the dot data of the predetermined color to be printed to the same region into dot data used for each of the plurality times of scanning; and step of allocating the dot data that has been subjected to the mask processing to the plurality of nozzle arrays in accordance with respective driving patterns for respective nozzle arrays, the respective driving patterns having driving permitting areas and driving non-permitting areas, wherein the mask pattern has a characteristics that frequency components of a low frequency region in a logical product pattern, which is obtained by a logical product operation of an arrangement of the print permitting areas in the mask pattern and an arrangement of driving permitting areas in the driving pattern for each of the plurality of nozzle arrays, are fewer than that of a high frequency region, and peaks of the frequency components do not exist in a region lower side of one-fourth of the low frequency region.

In the eighth aspect of the present invention, there is provided a data processing method that generates data used for performing printing by a plurality times of scanning of a plurality of nozzle arrays for printing dots of a predetermined color, to a same region of a printing medium, said method comprising: step of executing mask processing for dot data of the predetermined color by using mask patterns, in order to divide the dot data of the predetermined color to be printed to the same region into dot data used for each of the plurality times of scanning; and step of allocating the dot data that has been subjected to the mask processing to the plurality of nozzle arrays in accordance with respective driving patterns for respective nozzle arrays, the respective driving patterns having driving permitting areas and driving non-permitting areas, wherein the mask pattern has a characteristics that frequency components of a low frequency region in a logical product pattern, which is obtained by a logical product operation of an arrangement of the print permitting areas in the mask pattern and an arrangement of driving permitting areas in the driving pattern for each of the plurality of nozzle arrays, are fewer than that of a high frequency region, and peaks of the frequency components do not exist in a whole area of the low frequency region.

The above configuration allows mask processing to be performed on dot data with the use of a mask having an arrangement of print permitting areas in which low-frequency components are fewer than high-frequency components in a pattern obtained by the logical product of the arrangement of print permitting areas in the mask and an arrangement of driving permitting areas in a driving pattern for each nozzle group. This improves the dispersiveness of the print permitting area arrangement in the mask itself to be created. Also, respective arrangements of dots obtained by allocating the dot data processed with the use of the mask to a plurality of nozzle arrays to print based on the allocated data become improved in dispersibility. Further, an uneven distribution of a dot arrangement to one of the nozzle arrays is reduced. That is, the interference between the print permitting areas in the mask and a plurality of driving patterns is appropriately reduced, whereby an image printed with the use of the plurality of nozzle arrays becomes improved in dispersibility without any uneven distribution of dots. As a result, beading occurring during printing can be reduced among others, and thereby image quality can be improved.

Further features of the present invention has been will become apparent from the following description of exemplary embodiments (with reference to the attached drawings).

BRIEF DESCRIPTION OF THE DRAWINGS

FIGS. 13A to 13C are diagrams for explaining the relation between two nozzle arrays and block patterns according to Embodiment 1;

DESCRIPTION OF THE EMBODIMENTS

Embodiments of the present invention will be described in detail below with reference to drawings.

Figure 5:
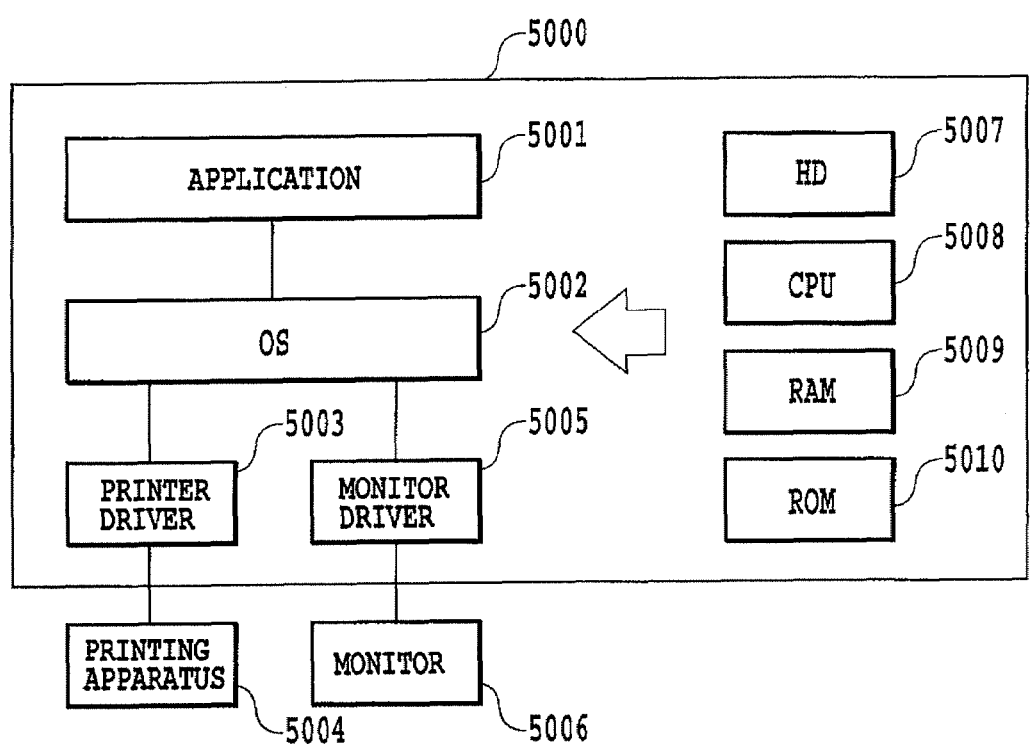
FIG. 5 is a block diagram mainly illustrating hardware and software configurations of a personal computer as an image processor according to one embodiment of the present invention.

FIG. 5 is a block diagram mainly showing the configuration of hardware and software of a personal computer (hereinafter also simply referred as PC) as an image processing apparatus in accordance with an embodiment of the present invention.

In a host computer PC 3000 shown in FIG. 5, an operating system (OS) 3002 makes software i.e. application software 3001, a printer driver 3003 and a monitor driver 3005 operate. The application software 3001 performs processing such as word processing, spreadsheet and internet browsing. The monitor driver 3005 executes processing such as producing image data for being displayed on a monitor 3006.

The printer driver 3003 processes various groups of drawing instructions (image drawing instructions, text drawing instructions, graphic drawing instructions and the like) issued from the application software 3001 to OS 3002 to generate image data finally to be used in a printer 3004. Specifically, image processing, which will be described later in reference with FIG. 6 and the subsequent Figures, is executed to generate 5-value index data for color components of each of cyan (C), magenta (M), yellow (Y) and black (K) inks used in the printer 3004. In the printer 3004, the dot arrangement pattern corresponding to each value (level) of these 5 values is output based on the index data.

The host computer 3000 is equipped with CPU 3008, a hard disk (HD) 3007, RAM 3009, ROM 3010 and the like, as various types of hardware to make above-mentioned software operate. That is, CPU 3008 executes processing according to above-mentioned software programs stored in the hard disk 3007 or ROM 3010, and RAM 3009 is used as a work area when the processing is being executed.

The printer 3004 as a printing apparatus is a serial-type printer in which a print head ejecting ink scans over a print medium and ejects ink during the scan, so as to perform printing. The print head is prepared for each of inks C, M, Y and K and these print heads can scan on the print medium by being mounted on a carriage. In each print head, the arrangement density of ejection openings is 1200 dpi and each ejection opening ejects 2 pico-liters (pl) of ink droplet. The number of ejection openings of each print head is 512. In a multi-pass printing method according to this embodiment, printing is performed in the number of pass depending on each embodiment described later.

Figure 6:
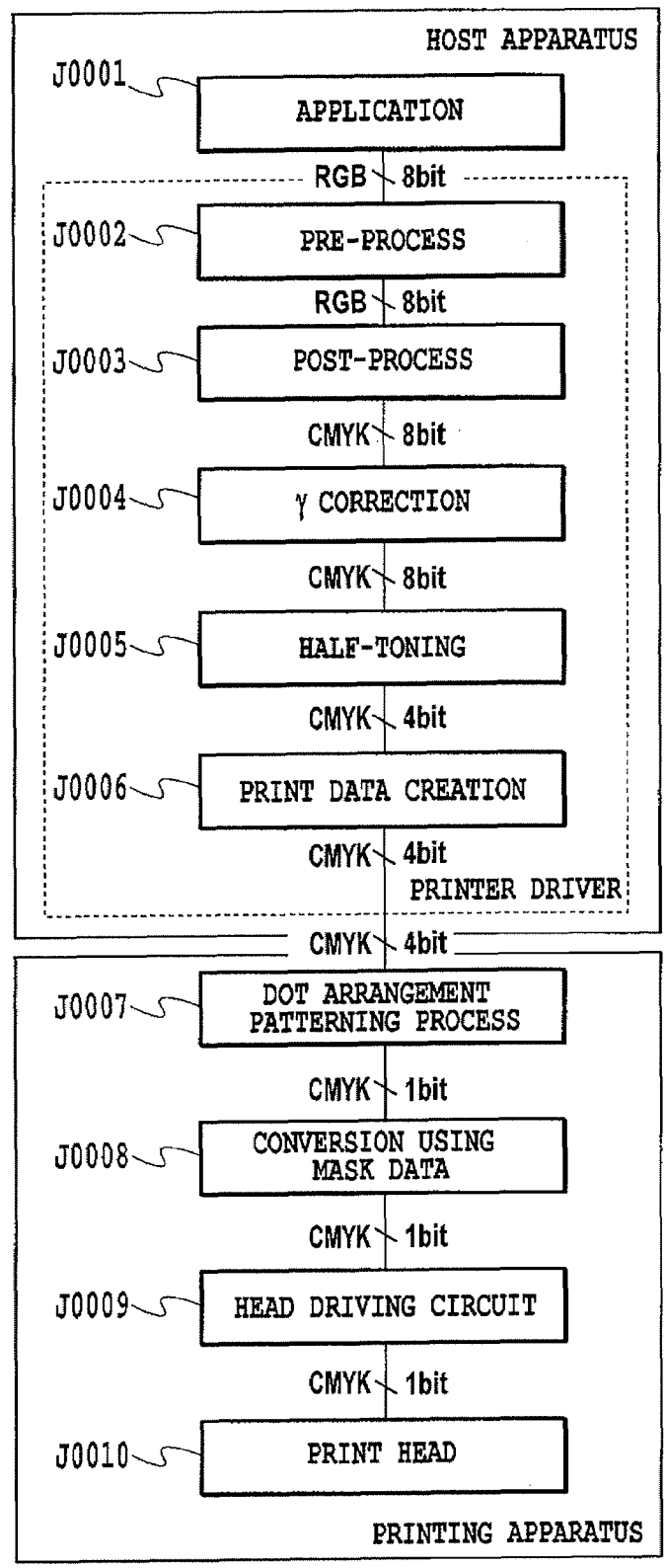
FIG. 6 is a block diagram for explaining the flow of an image data conversion processing in a printing system according to one embodiment of the present invention.

FIG. 6 is a block diagram illustrating the flow of image data conversion processing in a printing system according to this embodiment. As described above in reference with FIG. 5, the printer (printing apparatus) in this embodiment is equipped with print heads J0010, each print head ejecting each of four color inks C, M, Y and K. Each processing shown in FIG. 6 is executed on the printer or a personal computer (PC) as a host apparatus.

An application J0001 executes processing for creating image data to be printed in the printer. When printing is performed, image data created by the application is transmitted to the printer driver. The printer driver has pre-process J0002, post-process J0003, γ correction J0004, half toning J0005 and print data creation J0006 as its processing. Each processing will be briefly described below.

The pre-process J0002 performs mapping of color gamut (Gamut). This processing performs data conversion for mapping the color gamut reproduced by image data R, G and B of a sRG standard to within the color gamut that can be reproduced by the printer. Specifically, 256-valued 8-bit R, G and B data is converted to 8-bit R, G and B data having different color gamut respectively, by using a three-dimensional look-up table (LUT).

Based on R, G and B data mapped into the above-mentioned color gamut, the post-process J0003 finds 8-bit color separation data Y, M and C respectively that are combination of inks for reproducing colors represented by the R, G and B data. In this processing, conversion is performed by using the three-dimensional LUT likewise as in the pre-process as well as by using interpolation calculation.

The γ correction J0004 converts the density value (gradation value) for each color component of color separation data obtained by the post-process J0003. Specifically, the conversion is performed in such a way that the above-mentioned color separation data can lineally correspond to the gradation characteristics of the printer, by using a one-dimensional LUT.

The half toning J0005 quantizes each of 8-bit color separation data Y, M and C into each of 4-bit data by performing quantization processing. In this embodiment, 256-valued 8-bit data is converted into 5-valued 4-bit data by using a multiple-valued error diffusion method. This 4-bit data is gradation value information as an index for conversion processing to a dot arrangement pattern i.e. a binarization processing in the printer.

The print data creation processing J0006 creates print data by adding printing control information to printing image information whose content is above-mentioned 4-bit index data.

When print data is sent to the printer by above-mentioned processing in the host apparatus, the printer performs dot arrangement patterning process J0007 and conversion using mask data J0008 for the input print data.

The dot arrangement patterning process J0007 performs binarization processing by outputting dot arrangement patterns, based on 9-valued index data. This enables the binary information as to whether ink should be ejected or not, which is used by the printer in printing, to be obtained.

Figure 7:
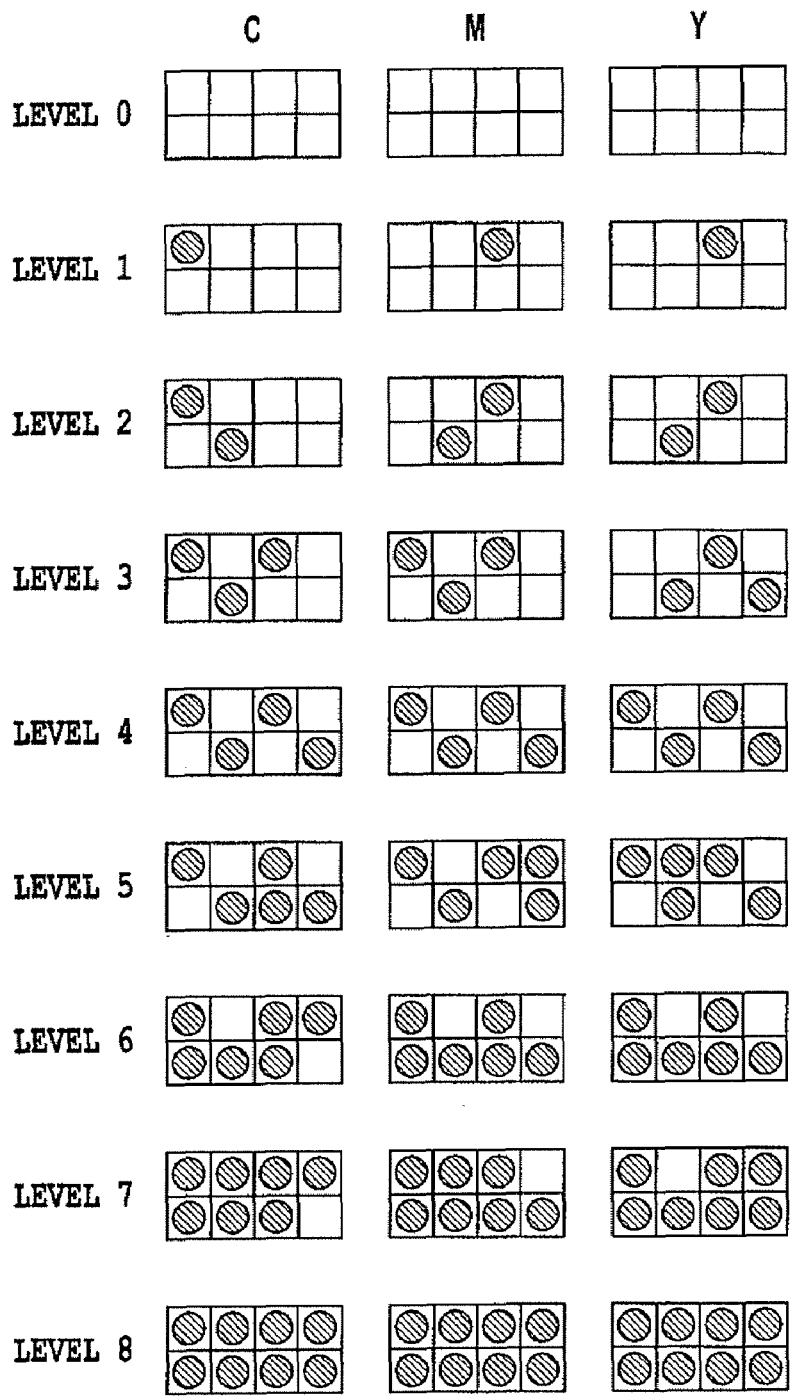
FIG. 7 is a diagram illustrating dot arrangement patterns corresponding to index data according to one embodiment.

FIG. 7 is a diagram showing dot arrangement patterns based on 9-valued index data in this embodiment. The dot arrangement patterns are determined for each of 9 values of gradation levels 0 to 8 indicated by index data for each of C, M, Y and K (drawing for K is not shown).

A 2×4 area composed of 2 longitudinal areas by 4 lateral areas, shown in the Figure, corresponds to one pixel that was output by the half toning processing. The size of this pixel corresponds to area density of 600 dpi (dot/inch) both longitudinally and laterally. Each of a plurality of areas composing one pixel is an area where printing/nonprinting of dots (ejection/non-ejection of ink) is defined. A "black" area indicates areas in which printing of dots are allowed. The number of areas where printing of dots is defined is determined depending on one of value of levels 0 to 8 indicated by index data.

One area of these dot arrangement patterns corresponds to the size of printing density of 1200 dpi (longitudinally) by 1200 dpi (laterally) in the printer in this embodiment. That is, the printer of this embodiment has a specification that one ink droplet of 2 pl is ejected from the print head of each color to form one dot for one area of 20 μm longitudinally by 10 μm laterally. The dot arrangement patterning process J0007 performs the processing for binarizing 9-valued data by using above-mentioned dot arrangement patterns to generate one-bit ejection data of "1" or "0" regarding the ejection opening corresponding to each area and a printing column.

Then, the conversion using mask data J0008 performs mask processing for the dot arrangement of each color determined by the dot arrangement patterning process J0007, by using a plurality of mask patterns, each of which is complementary each other. This generates ejection data for each scanning, composing multi-pass for each of C, M, Y and K colors. In the mask patterns used in this processing, as described in detail later in reference with FIG. 8 and subsequent Figures, those interference with the block patterns, based on which two nozzle arrays of the print head are drive and which are used in a head driving circuit J0008, is reduced. Also, the dispersibility of the print permitting area pattern of the mask itself is increased. Furthermore, in masks of a second embodiment of the present invention, which will be described later, in addition to above-mentioned features, the interference between respective patterns of a plurality of masks is also reduced. Here, in the case that dot data corresponding to an area of the mask in which the print permitting area is arranged "1" (ejection) or "0" (non-ejection), the print permitting area of the mask is defined as an area that outputs dot data of "1" or "0" as it is, respectively. On the other hand, print non-permitting area is defined as an area that outputs dot data of "0" regardless of the content of the dot data.

The ejection data obtained by mask processing is supplied to a head driving circuit J0009 at appropriate timing for each of a plurality of times of scanning of multi-pass printing. One bit data of each color input into the head driving circuit J0009 is distributed to two nozzle arrays as dot data for each ink color, in accordance with block patterns which are described later in reference to FIG. 11. Then, the head driving circuit J0009 supplies driving pulses to a print head J0010 so that ink is ejected from each print head J0010 for each color at predetermined timing. Thus ink ejection depending on ejection data is performed to print an image on the print medium. A plurality of mask data described in the embodiments below is stored in the memory of the printer. Further, the above-mentioned dot arrangement patterning process and conversion using mask data in the printer are executed by using their dedicated hardware circuits and under the control of CPU composing the control section of the printing apparatus. The printer that mainly performs conversion using mask data composes a data processing apparatus.

Several embodiments of methods for creating a mask pattern to be used or created in the above-mentioned printing system and of mask patterns according to the methods will be described below. Before that, the basic method for creating the mask pattern and the concept of a calculation repulsive force used therein will be described.

(Method of Creating Mask)

In the basic method for creating a mask described below, one mask used for the mask processing in which print permitting areas of a mask are arranged and a block pattern for driving the print head which has the same size as that of the mask are commonly referred as "plane" in order to simplify the description. Further, the print permitting areas and the driving permitting areas (areas indicated by "black" in FIGS. 13A and 13B) that are arranged in these patterns are referred as simply "dot".

In the method of creating the masks according to the embodiment of the invention, for the planes of the block pattern and the masks, first, the three planes of planes A1, A2 and A3 are set as shown in FIGS. 8A-8D. Then, repulsive forces are exerted between the dots within the identical plane and between the dots in the respective different planes. Also, the superposition of the dots of the different planes is permitted, and a repulsive force is exerted between such superposed dots. Thus, the arrangements of the dots within the respective planes are determined.

A method of determining the arrangements of the dots in the planes is broadly classified into two methods; a method which simultaneously determines arrangements of a plurality of planes (simultaneous generation), and a method which sequentially determines the arrangements of the respective planes (plane-by-plane generation). Moreover, for each of the above two generation methods, a manner of determining the arrangement of dots includes a method of arranging all the dots in the plane in a predetermined way and moving the arrangement, while making the entire plane being generated more dispersive (this method is hereinafter be referred to as an "arrangement moving method"). As other method, a method can be executed in which each dot is placed while making the entire plane being generated more dispersive (this method is hereinafter referred to as a "sequential arrangement method").

(Arrangement Moving Method)

The outline of an arrangement determination process for dots that is based on the arrangement moving method is as stated below.

For example, in case of determining the arrangements of the dots in the plane whose arrangement rate is 50%, an initial arrangement in which 1 bit data each being "1" are allocated at 50% of allocable positions is obtained by a binarization process, such as an error diffusion method, as to each of planes A1, A2 and A3. It should be noted that the reasons why the initial arrangements of the dots are obtained by employing the binarization technique are that the arrangements whose dispersiveness is favorable in an initial state to some extent can be obtained in correspondence with the binarization technique employed, and that a calculation time period or convergence time period till the final arrangement determination can be shortened in this way. In other words, the method of obtaining the initial arrangements is not essential in applying the present invention, but it is also allowed to adopt, for example, an initial arrangement in which the 1 bit data being "1" are allocated at random in the plane.

Then, a repulsive potential is calculated for all the dots in each of the planes A1, A2, A3 obtained as described above. Specifically, (i) Repulsive force is applied to the dots of the same plane depending on the distance between these dots.
(ii) Also, repulsive force is applied to the dots of different planes.
(iii) Different repulsive force is applied for the same plane and the different planes.
(iv) Dots of different planes are allowed to overlap one another, and repulsive force is applied to overlapping dots (two, three, or more dots) according to combinations of the overlapping dots.

Figure 9:
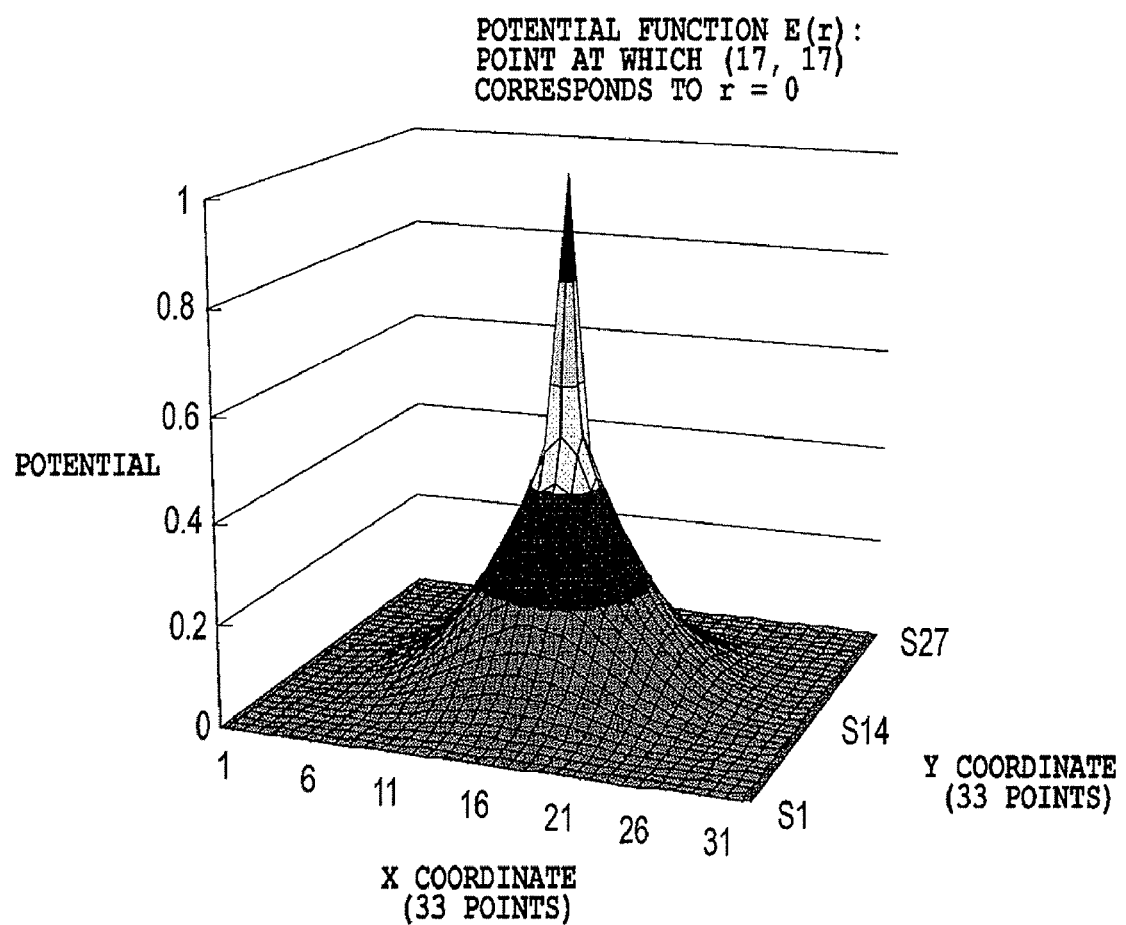
FIG. 9 is a diagram schematically illustrating a function for a basic repulsive potential E(r) according to one embodiment.

FIG. 9 is a diagram schematically showing a function for a basic repulsive potential $E(r)$ according to the present embodiment.

As shown in FIG. 9, for the repulsive force function that is defined in the present embodiment, the coverage of the repulsive force is up to $r=16$ (16 positions on which dots are arranged). The potential that attenuates depending on the distance basically brings a high energy state, that is, an unstable state when dots are arranged close to one another. Thus, the convergence calculation makes it possible to avoid selection of a dense arrangement as much as possible. The shape of the repulsive force is more desirably determined by the ratio of the dots to all the allocable positions.

Further, in the case of considering the arrangement of the dot in which plural dots overlap one another, it may occur that the number of positions where dots are arranged exceed that of positions where dots can be arranged (for a resolution of 1200 dpi (dot/inch), 1200×1200 possible positions in a 1-inch square), and then the arranged dots are made overlapped each other. Accordingly, in calculating the repulsive potential of each dot, considerations need to be given for possible overlapping of dots each other. Thus, the function is defined so as to have a finite repulsive potential at r=0. This enables dispersion with possible overlapping of dots taken into account.

The present embodiment executes calculations such that a repulsive potential αE(r) is applied to the dots on the same plane, a repulsive potential βE(r) is applied to the dots on different planes, and a repulsive potential γs(n)E(r) is applied to overlapping dots. More specifically, a repulsive potential resulting from the presence of a certain dot is what is obtained by adding following potentials to the above repulsive potential: the repulsive potentials of dots on the same plane, dots on different planes, and an overlapping dots on different planes, respectively within the distance r from the certain dot.

For the above repulsive potentials, coefficients α, β, and γ are weighting coefficients and in the present embodiment, α=3, β=1, and γ=3. The values α, β and γ affect the dispersiveness of dots. The values α, β and γ can be actually determined by, for example, experimental optimization based on print images printed using the block patterns and the masks.

The coefficient s(n) is used for an multiplying in addition to γ in order to disperse overlapping dots. The coefficient s(n) has a value corresponding to the number of overlaps so as to increase the degree of dispersion of the dots consistently with the number of overlaps. The present inventor experiments show that an appropriate dispersion can be achieved by using s(n) determined by either of the two equations:

$$s(n) = \sum_{i=1}^{n} nC_i \text{ or } s(n) = \sum_{i=1}^{n-1} nC_i$$ [Equation 1]

That is, when the n denotes the number of overlaps, the sum of numbers of combinations is denoted by s(n). Specifically, for an object dot for which repulsive force is to be calculated, overlapping dots (which are located at the same position as that of the object dot on the same plane or different planes) and overlapping dots located at the distance r from the object dot are searched. In this case, n denotes the number of overlaps common to overlapping of the object dot and the dot on the same plane and the different planes, which overlap the object dot at the same position, and overlapping of the dots which are located at the distance r from the object dot, on respective planes, and overlap each other in the same manner. Then, for these two positions, repulsive forces resulting from the overlapping dots are considered.

In the case of considering an example in which for two positions, dots are present commonly on a first plane, a second plane and a third plane, n is defined as 3. Then, repulsive force attributed to the overlapping of the three dots is allowed to act on these positions. Here, when the repulsive force resulting from the overlapping of the three dots is considered, the repulsive force of the overlapping of every two dots and the repulsive force of each dot are considered to act in a multiplexing manner together with the repulsive force of the overlapping of the three dots. In other words, with the plane A3 not taken into account, the overlapping may be considered to occur between two dots on the first plane and the second plane. With the second plane not taken into account, the overlapping may be considered to be the one between two dots on the first plane and the third plane. With the first plane not taken into account, the overlapping may be considered to occur between two dots on the second plane and the third plane. To calculate the multiplexing effect of overlapping of the dots, the repulsive force resulting from the combination of overlaps is defined and s(n) such as the one described above is used. The experiments show that this makes it possible to provide a highly dispersive dot arrangement.

When the total energy is determined which is equal to the sum of the repulsive potentials of all the dots, as described above, processing is executed to reduce the total energy.

This processing involves sequentially shifting each of the dots to one of the allocable positions located at a distance r of at most 4, at which position the repulsive potential of the shifted dot most decreases. This processing is repeated to reduce the total energy that is equal to the sum of the repulsive potentials of all the dots. In other words, the process of gradually reducing the total energy corresponds to the process of sequentially making the arrangement of the dots more dispersive, that is, the process of gradually reducing low frequency components of the dots.

Then, the rate of a decrease in total energy is calculated. If the rate is determined to be equal to or less than a predetermined value, the energy attenuating process is ended. It should be noted that the predetermined value can be determined, for example, on the basis of the results of actual printing and corresponds to a decrease rate at which an image with appropriately reduced low frequency components can be printed. Finally, respective planes with the rate of a decrease in total energy equal to or less than the predetermined value are set as final arrangements of the dots.

FIGS. 8A to 8D are diagrams schematically showing the repulsive potential calculation and total energy attenuating process, described above. More specifically, these figures include perspective views showing the three planes A1, A2, and A3 according to the present embodiment and plan views specifically showing movement of the dots. In the figures, the smallest squares show allocable positions of the dots. Positions overlapping each other among three overlapping planes correspond to the same allocable positions among the planes.

Figure 8A:
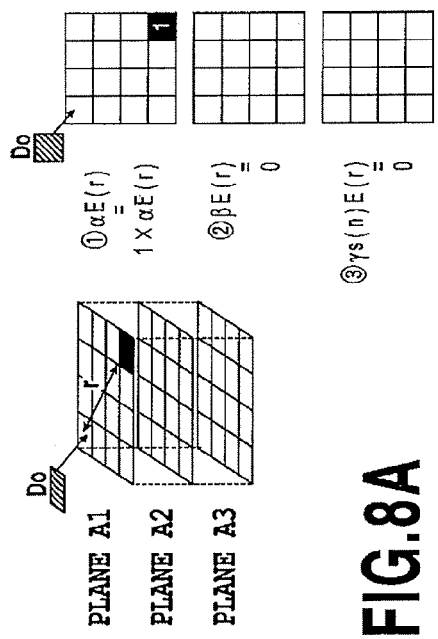
FIGS. 8A to 8D are diagrams schematically illustrating repulsive potential calculations and attenuation processing for total energy according to one embodiment of the present invention.

FIG. 8A illustrates that when dots are present on the same plane, the repulsive force of these dots is added to (increases) the repulsive potential. In the example shown in the figure, one dot is present on the same plane A1 on which the dot Do of an object position is present at the distance r from that position. In this case, α=3 is applied, and a potential 1×αE(r) is added as the potential of the object dot Do.

Figure 8B:
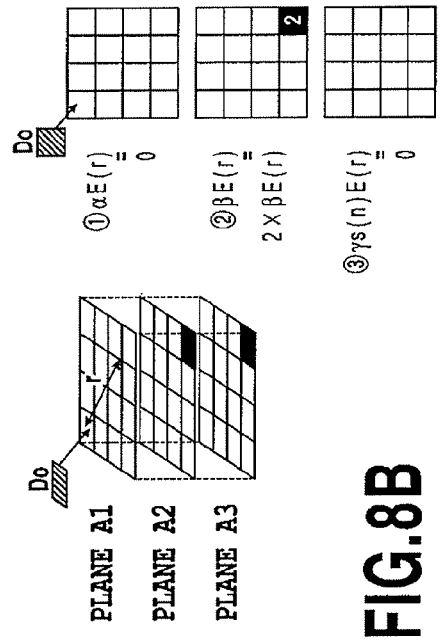

FIG. 8B is a diagram illustrating that dots are present on planes (planes A2 and A3) different from that on which the object dot Do is present and that a repulsive potential is added on the basis of the relationship between the object dot and these two dots. The relationship between the object dot and these two dots is that between different planes. Then, β=1 is applied and a potential 2×βE(r) corresponding to the two dots is added.

Figure 8C:
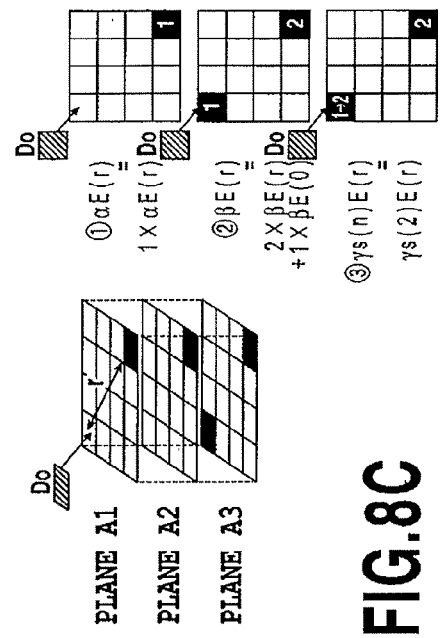

FIG. 8C is a diagram illustrating that dots are present on the same plane on which the object dots is present and on planes different from that on which the object dot is present as is the case with the above two figures, and in addition, a dot is present on the same position of a different plane and then that dot and the object dot overlap each another, and illustrating the repulsive potential based on the relationship among these dots. Not only the conditions shown in FIGS. 8A and 8B are met but an dot is present at the same position on the plane A3, which is different from the plane A1 with the object dot Do present. Thus, the following potentials are added: the repulsive potential $1 \times \alpha E(r)$ of one dot on the same plane, the repulsive potential $1 \times \beta E(0)$ of one dot on the different plane at the same position, the repulsive potential $2 \times \beta E(r)$ of two dots on the different planes, and the repulsive potential $\gamma s(2) \times E(r)$ of overlapping to which $\gamma=3$ is applied at a overlap number n=2. As s result, in the dot arrangement shown in FIG. 5C, the sum of the repulsive potentials associated with the presence of the object dot Do is $1 \times \beta E(0)+1 \times \alpha E(r)+2 \times \beta E(r)+\gamma s(2) \times E(r)$.

Figure 8D:
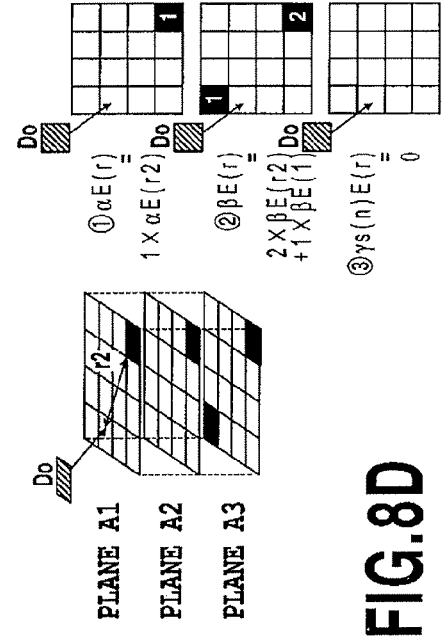

FIG. 8D is a diagram illustrating that in the dot arrangement shown in FIG. 8C, movement of the dot Do changes the sum of repulsive potentials of this dot. As shown in FIG. 8D, when the dot Do (located on the plane A1) shifts to an adjacent position on the same plane, the sum of the repulsive potentials associated with the presence of the dot Do changes into $\beta E(1)+1 \times \alpha E(r2)+2 \times \beta E(r2)$ because the distance changes into r2 from r and the number n of overlaps becomes 0. For the dot arrangement shown in FIG. 8C, the sum of the repulsive potentials $1 \times \beta E(0)+2 \times \beta E(r)+1 \times \alpha E(r)+\gamma s(2) \times E(r)$ is compared with the sum of the repulsive potentials resulting from movement of the dot Do in FIG. 8D. This determines a change in the sum of the repulsive potentials after the movement.

In the above description, the sum of the repulsive potentials is obtained by determining the sum of energies of the dots between two positions, or of the dots among three positions when the dot is moved. However, this is for simplification and the sum of the repulsive potentials is of course obtained by integrating the repulsive potentials on the basis of the relationship between the dot of interest and dots including those of other possible positions other than the above dots.

If, of the dots for each of which the sum of the repulsive potentials is calculated as shown in FIGS. 8A to 8C, for example the dot Do shows the largest repulsive potential sum, changes in repulsive potential after the movement of the position of the pattern Do is determined as described in FIG. 8D and the dot Do is moved to the position with most decreasing of repulsive potential sum. This processing is repeated to enable a reduction in the total energy of the three planes. That is, the dot arrangement of the superposing of the three planes is appropriately distributed with few low frequency components.

The dots are appropriately dispersed among the three superposed planes A1, A2, and A3, and thus, the dots are also appropriately dispersed among the complementary masks in the case that these three masks are respectively masks for the multi-pass print of two-passes. Further, the dots of superposing of an arbitrary number (2, 3, 4, or 5) of these 6 planes are also appropriately dispersed and have few low frequency components.

In the above description, the arrangement moving method is applied to three plane masks which are used for the first pass and which are included in the masks for two passes. However, the arrangement moving method is not limited to this aspect but is applicable to all the planes to determine the arrangement of the dots. For the masks for two pass printing according to the present embodiment, the arrangement moving method is applicable to six plane masks for two passes. In this case, the range within which the dots are moved is not limited to nearby pixels. Arranged pixels may be moved on the basis of the relationship between the corresponding dots on different planes. Specifically, for example, a dot on one plane may be moved to an area on the same plane on which no dot is placed, and a dot placed on an area of another plane which corresponds to the moved pixel may be moved to a pixel on the same plane which corresponds the pixel on which the above dot was located. This makes it possible to change the arrangement relationship among the dots on all the planes involved in the repulsive potential calculation. Consequently, the positions of the dots can be changed to one another so as to minimize the potential energy.

(Sequential Arrangement Method)

This method is a method which sequentially arranges dots in a part of a plane where no dots have been arranged yet, as described above. This method sequentially places an dot on three planes one by one, for example, shown in FIGS. 8A to 8C and repeats this operation to arrange the dots according to arrangement rate of each plane. In this case, before a dot has been arranged, calculation is made of the possible repulsive potential between the dot of that position and each of the dots already arranged on the planes A1, A2, and A3. The repulsive potential can be calculated in the same manner as described above for the arrangement moving method. The difference between the present method and the arrangement moving method is that with reference to the example shown in FIGS. 8A to 8C, if in contrast to the above arrangement moving method, the dot Do, shown in these figures, has not been placed yet but is to be newly placed, the repulsive potential is calculated on the basis of the relationship between the dot Do and dots already arranged on the same plane A1 and on the different plane A2 or A3. As is also apparent from the description, at the initial stage where no dots have been arranged yet, the repulsive potential has the same value regardless of the position of the dot.

Next, among the repulsive potentials calculated under the assumption that the dot is placed on each of positions of the planes, a position having the minimum potential energy is determined. If plural positions show the minimum energy, random numbers are used to determine one of the plural positions. In the present embodiment, the position with the minimum energy is determined under the condition that on the same plane, no dot is placed on a position on which an dot has already been placed. This is because depending on a parameter such as the weighting coefficient or repulsive potential function, in the repulsive potential calculation, overlapping of dots on the same plane may result in the minimum energy as a result of the relationship between the object dot and dots on the other planes and because in this case, the overlapping is prohibited because only one dot is allowed to be placed on one position. An dot is placed on the determined position with the minimum potential energy. That is, dot data on that area is set to "1". Then, the method determines whether or not one dot has been placed on each of the planes A1, A2, A3. If this placement has not been finished, the processing is repeated.

When one dot has been sequentially placed on the planes A1, A2, and A3 in this order, the method determines whether or not dots have been arranged on up to 50% of all allocable positions. Once 50% of the dots have been arranged on each of the three planes, the present process is finished.

The above described sequential arrangement method also makes it possible to produce planes having characteristics similar to those of planes produced by the above arrangement moving method. That is, for the three planes obtained by the sequential arrangement method, the dots are appropriately dispersed in the superposed planes.

The above plane generating methods are further characterized by generating no such a periodic pattern as has regularly repeated dot arrangements. These methods do not generate, for example, such a periodic pattern as has repeated any checker pattern or any repeated Beyer type arrangements. Even if such a pattern is generated, re-setting the repulsive potential parameter enables convergence to the state in which generation of period patterns is avoided. Thus, the planes generated by the mask creating methods according to the present embodiment have a periodic patterns.

In the above-mentioned description, the plane of a block pattern (driving pattern) and that of a mask is described as "plane" without discriminating between both planes in order to simplify the description. As described relating to each embodiment below, however, in calculating repulsive force, of those two types of planes, the plane corresponding to the block pattern or dots within the plane are preliminary determined as the block pattern. More specifically, dots arranged on the plane corresponding to the block pattern are dealt with as being fixed and are not determined by the moving of the dot arrangement and the arrangement of dots depending on energy of repulsive potential. That is, in the embodiment of the present invention, dot arrangement is determined for the plane corresponding to the mask; and in determining the dot arrangement, the plane corresponding to the block pattern or its dots is subjected to repulsive potential calculation. Specifically, when the dot arrangement on a plane corresponding to a mask is determined, the term of weighting coefficient α of repulsive potential calculation is applied to the plane corresponding to the mask. The terms of coefficients β and γ are applied to between the plane corresponding to the mask and the plane corresponding to other mask or a block pattern.

Thus, the arrangement of print permitting areas in the mask to be created is made for considering the arrangements of driving permitting areas in the block patters to avoid the mutual interference between the arrangement of print permitting areas and the block pattern, and also the arrangement pattern itself of print permitting areas of the mask is made highly dispersed.

Methods for creating a mask by using above-mentioned basic method, in accordance with several embodiments of the present invention, will be described below.

Embodiment 1: 100% Even Mask for Two Pass Printing (Summary of the Embodiment)

This embodiment relates to multi-pass printing of two-pass in which an image is completed by twice of scanning by using one print head equipped with a nozzle array ejecting cyan (C) ink as a printing element. Masks used for the two-pass printing have respective patterns whose interference with the block pattern for driving the print head are reduced and which are well dispersed. This prevents dots formed by each scanning from being unevenly distributed in number. Furthermore, since dots are dispersedly formed in each scanning, even if there is a deviation of printing position for example, texture that may be caused by the deviation is visually unobtrusive, thus suppressing adverse effects on image quality.

Figure 10:
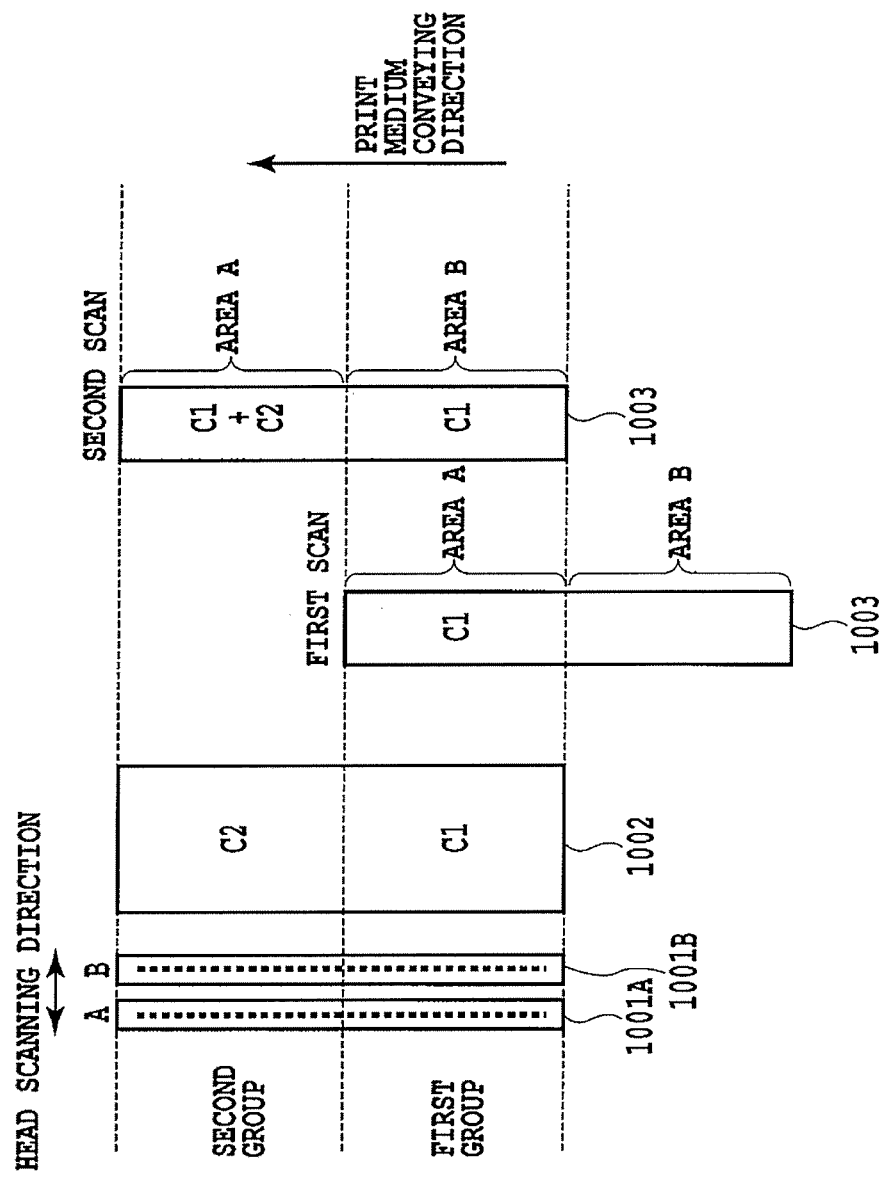
FIG. 10 is a diagram schematically illustrating positions of two nozzle arrays, a mask and a printing medium for explaining 2-pass printing according to Embodiment 1 of the present invention.

FIG. 10 is a diagram schematically showing mainly the positional relationship of a print head, a mask pattern and a print medium in order to illustrate two-pass printing. A print head is equipped with two nozzle arrays 1001A, 1001B of cyan ink each of which includes 512 nozzles arranged with 1200 dpi interval. In two-pass printing, 512 nozzles are divided into a first group of nozzles and a second group of nozzles, each group including 256 nozzles. Masks 1002 (two masks C1 and C2) are associated with respective groups and the size of respective masks C1 and C2 in a sub-scan direction (conveying direction) is equivalent to 256 areas that are the same as the number of the nozzles of respective groups. Since the masks C1 and C2 are complementary each other, superposing these masks enables printing of the area corresponding to 256 (lateral) areas×256 (longitudinal) areas to be completed. More specifically, this embodiment uses two nozzle arrays that are capable of printing the same area for one color in one time of scanning. However, the mask processing does not distinguish the two nozzle arrays. That is, the masks C1 and C2 are made correspond to one nozzle array. Then, after the mask processing is performed as described before, the dot data that has been subjected to the mask processing is allocated to the two nozzle arrays as described later in reference to FIG. 13.

As shown in FIG. 10, printing is performed on a area A of a print medium 1003 by using the mask C1, the print medium is conveyed by 256 areas and then printing is performed on the area A by using the mask C2. Printing of an image is completed by the twice pass.

(Method of Creating Mask)

A method of creating the mask in accordance with this embodiment will be described regarding the case in which the mask is created by using above-mentioned sequential arrangement method.

Figure 11:
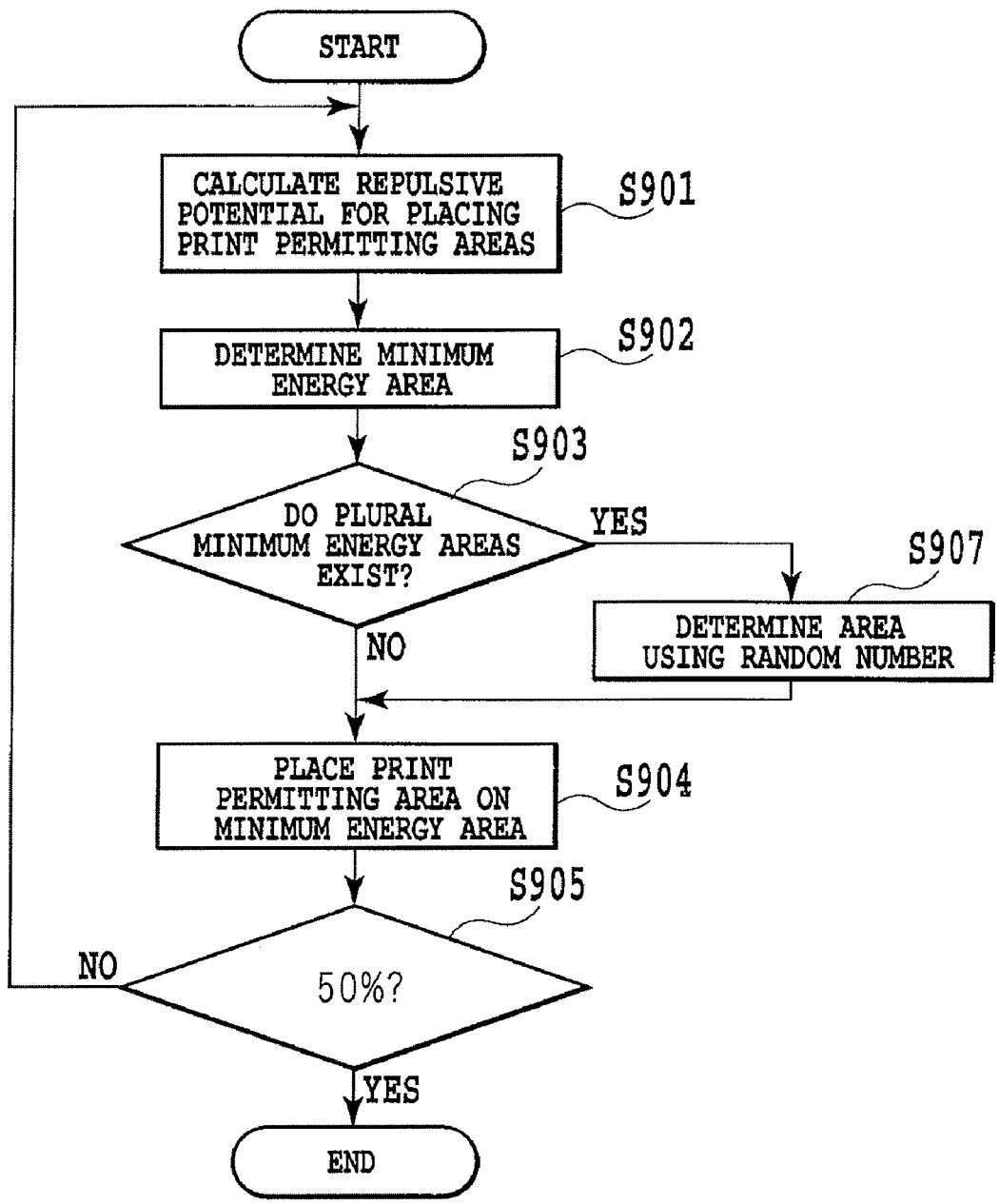
FIG. 11 is a flowchart illustrating an arrangement determination processing of print permitting areas based on a sequential arrangement method according to Embodiment 1.

FIG. 11 is a flow chart showing arrangement determination processing of print permitting areas according to the sequential arrangement method in accordance with this embodiment.

In processing shown in FIG. 11, the arrangement of print permitting areas is performed at 50% of arrangement rate in such a way that a print permitting area is sequentially arranged on one plane. In step S901, firstly, the plane of mask C where print permitting areas will be arranged and the plane of the block patterns are specified and repulsive potential is calculated for the arrangement of print permitting areas in these planes. At this time, as described above, dots (driving permitting areas) have been already arranged on the plane corresponding to the block patterns. Thus, while the dots remain fixed, repulsive force is calculated between the dots and print permitting areas to be arranged on the plane of mask C.

Figure 12:
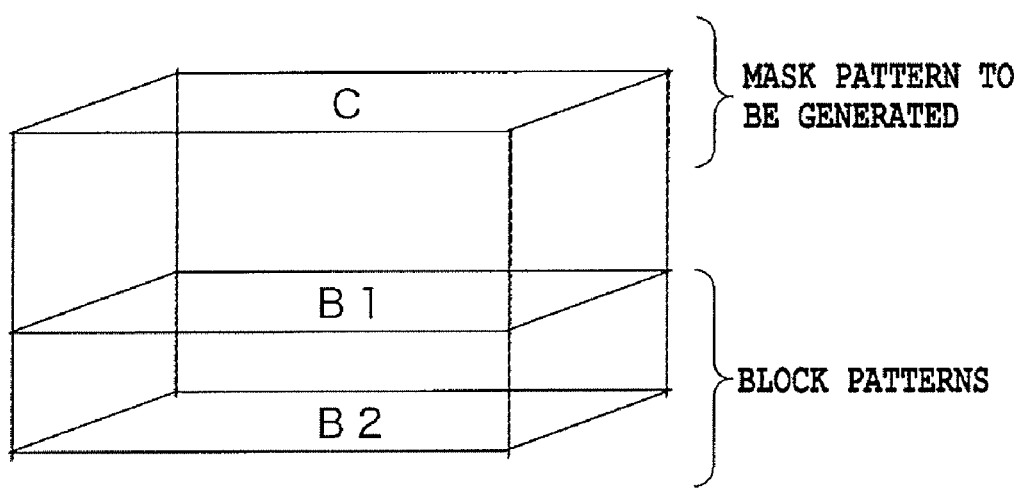
FIG. 12 is a diagram for explaining a concept of a method for creating a mask C according to Embodiment 1.

FIG. 12 is a diagram showing a concept for calculating repulsive force regarding the arrangement of print permitting areas on the mask C. In calculating repulsive force, the planes B1, B2 of the block patterns to be considered are fixed patterns. These block patterns of the planes B1, B2 are used for determining any one of the nozzle arrays 1001A, 1001B to which the dot data which has been subjected to the mask processing is allocated.

FIGS. 13A to 13C are diagrams for explaining the block patterns.

Figure 1A:
FIGS. 1A and B are diagrams for explaining one nozzle array and two nozzle arrays used for ink of one color.
Figure 1B:
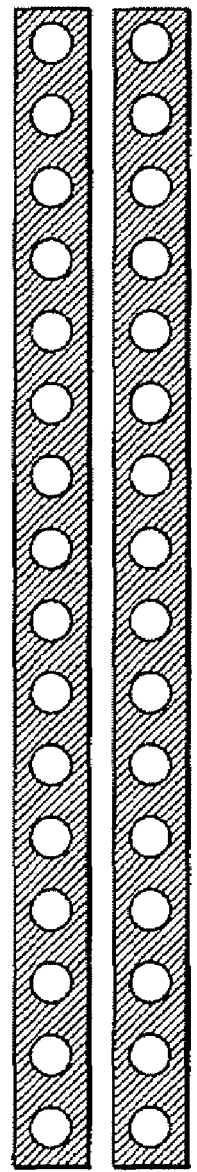
Figure 2:
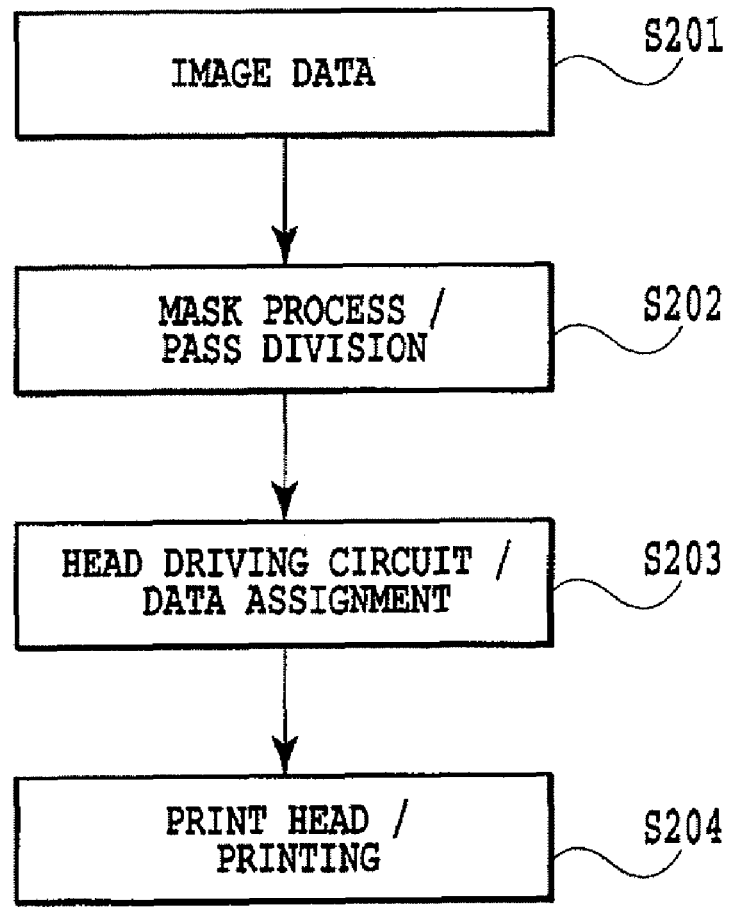
FIG. 2 is a diagram for explaining a processing until image data is printed by a print head in multi-pass printing.
Figure 3:
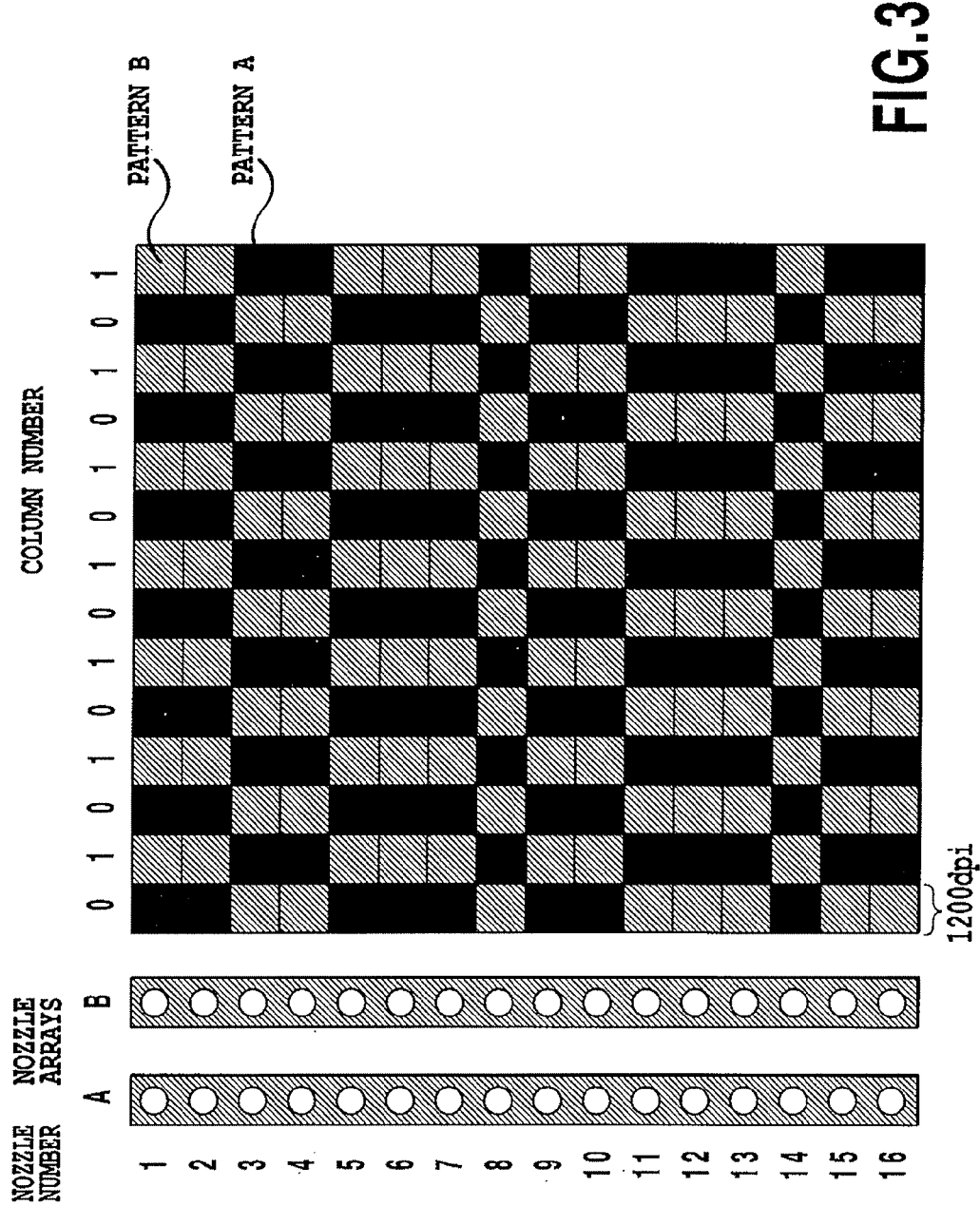
FIG. 3 is a diagram for explaining block patterns associated with a nozzle drive for the case where two nozzle arrays are used for printing for ink of one color.
Figure 4:
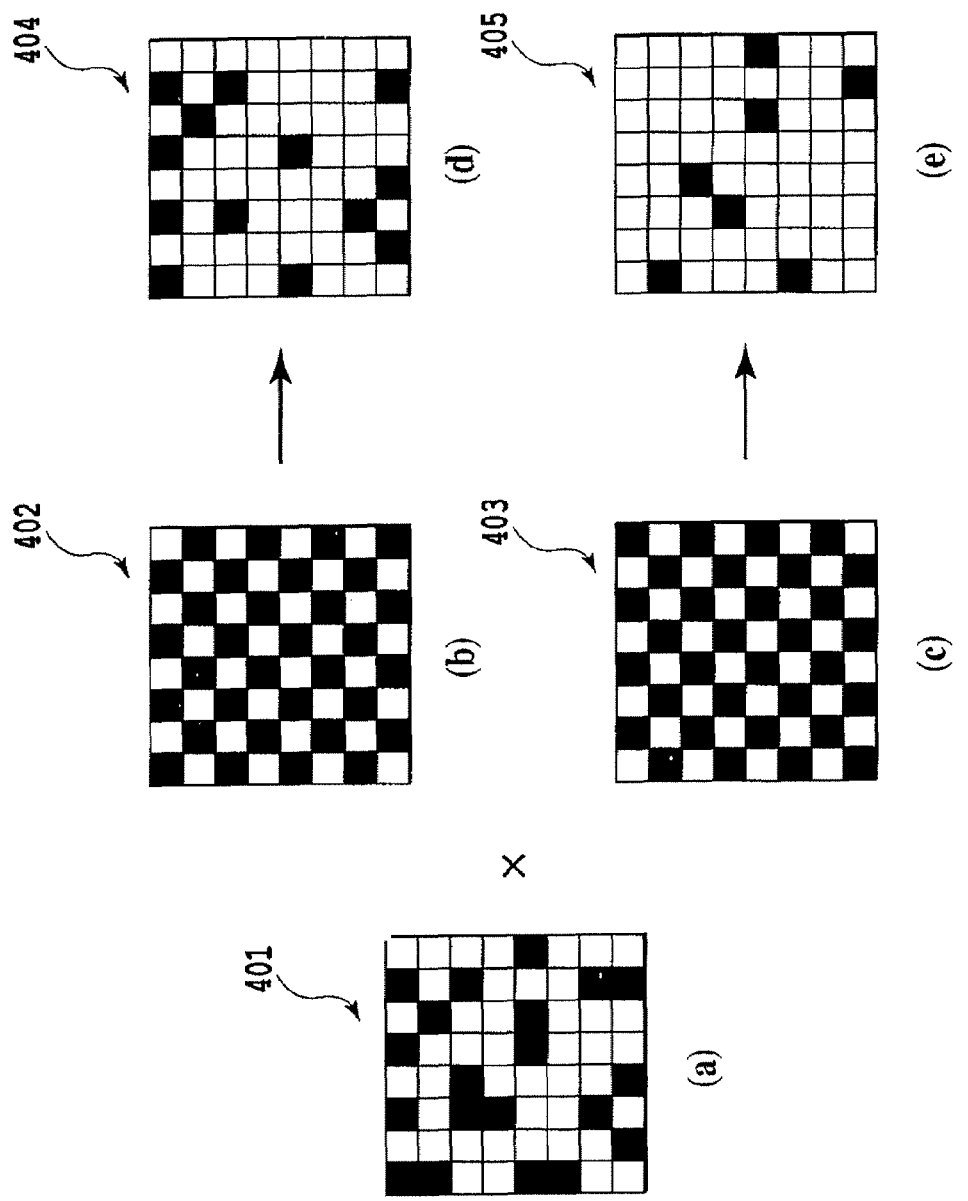
FIG. 4 is a diagram for explaining that when a dot pattern, which is image data, is printed with two nozzle arrays, printed dots are unevenly distributed by block patterns.

FIG. 13A shows two nozzle arrays A and B and how to allocate dot data to any of the array A or array B for printing, and is similar drawing to FIG. 3. As described above with reference to FIG. 3, the dot data is allocated to the nozzle arrays A and B according to the block patterns A and B, respectively. Specifically, when the column 0 is printed, nozzles with nozzle numbers {1, 2}, {5, 6}, {9, 10} and {13, 14} are used in the nozzle array A, and those with nozzle numbers {3, 4}, {7, 8}, {11, 12} and {15, 16} are used in the nozzle array B. When the column 1 is printed, nozzles exclusive of (complement to) those used for the column 0 are used in both of nozzle arrays A and B, since this is a case where the two nozzle arrays are used.

FIGS. 13B and 13C show the block patterns A and B respectively. That is, the dot data is allocated to respective nozzles of the nozzle array A for driving, based on the block pattern shown in FIG. 13B, and to respective nozzles of the nozzle array B for driving, based on the block pattern shown in FIG. 13C.

In addition, this embodiment employs a block pattern of a checker pattern as shown in FIGS. 13B and 13C; however, it should be appreciated that the block pattern is not limited to the checker pattern. Any other pattern can be used if the pattern has dispersive effect described herein in relation to a mask.

In consideration of the above block patterns, in the processing for determining the arrangement of print permitting areas of the mask C, a repulsive potential between the print permitting areas in the mask pattern C, and that between the print permitting area in the mask pattern C and the driving permitting area in the plane B1, B2 are calculated. Then, based on the calculation result of the repulsive potential, the arrangement of the print permitting areas of the mask C is determined as described above.

That is, in the next step S902, an area having minimum potential energy among repulsive potentials calculated at the time when a print permitting area is placed is determined. Then, in step S903, it is determined whether or not a plurality of areas having the minimum energy exists. If a plurality of areas has the minimum energy, one area out of the plurality of areas is determined by the use of a random number in step S907.

In step S904, the print permitting area is placed on the area having the minimum potential energy determined as above.

Finally, in step S905, it is determined whether or not the print permitting areas are placed on the C plane up to 50% of all areas of the mask. If the print permitting areas are not placed up to 50%, the steps from step S901 are repeated. Then, if the print permitting areas are placed on the C plane up to 50%, the processing is terminated.

As described above, regarding the mask C1 for the first pass, the arrangement of print permitting areas is determined. Then, regarding the mask C2 for the second pass, the arrangement of print permitting areas complement to those of the mask C1 is determined.

According to the above-described method for creating a mask of this embodiment, the dispersibility in the arrangement of the print permitting areas of the mask C to be created becomes improved. Along with this, dispersibilities of respective arrangements of dots obtained by allocating dot data processed with the use of these masks to the two nozzle arrays and then printing the allocated data become improved. Furthermore, an uneven distribution in a dot arrangement by one of the nozzle arrays can be reduced. That is, interferences between the print permitting areas of the mask and the two block patterns are appropriately reduced, whereby an image printed with the use of the two nozzle arrays becomes improved in dispersibility without an uneven distribution of dots. As a result, beading occurring during printing can be reduced among others, and thereby image quality can be improved.

(Mask Characteristics Evaluation)

Figure 14:
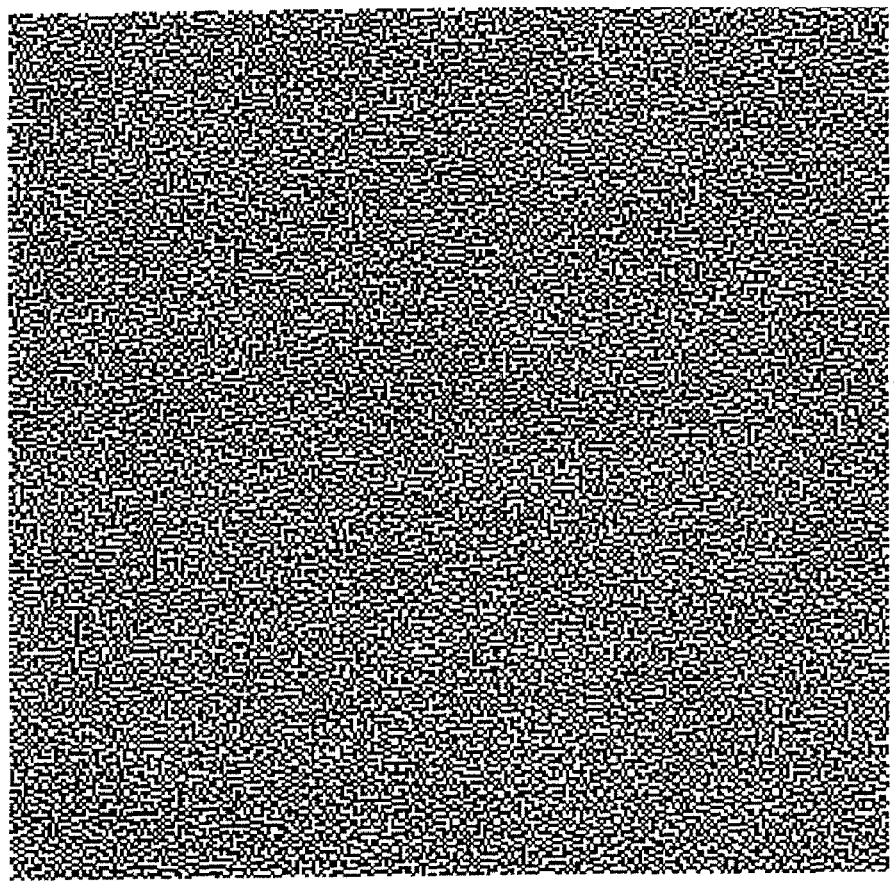
FIG. 14 is a diagram illustrating a pattern of a mask C1 created based on Embodiment 1.
Figure 15:
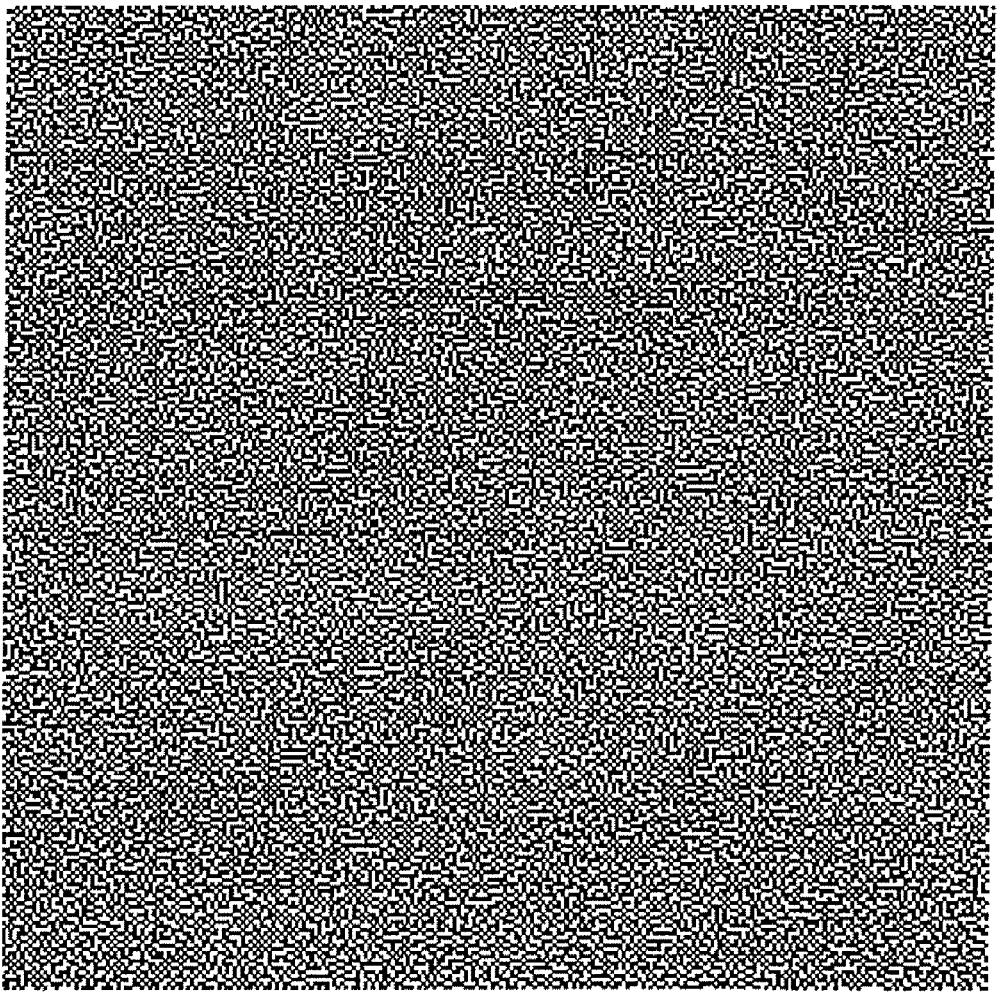
FIG. 15 is a diagram illustrating a pattern of a mask in the related application according to a comparative example.

Comparison between the mask in this embodiment and that in a comparative example FIG. 14 is a diagram illustrating an arrangement pattern of print permitting areas of the mask C1 created based on the above-described creating method in this embodiment. FIG. 15 is a diagram also illustrating a pattern of print permitting areas of a mask described in a related application, i.e., Japanese Patent Application No. 2005-197873. In addition, each of the masks illustrated in these diagrams comprises 256 areas×256 areas.

As shown in FIGS. 14 and 15, in either mask, the dispersibility in the arrangement of print permitting areas exhibits no uneven distribution, which makes an impression of smoothness in whole.

Figure 16B:
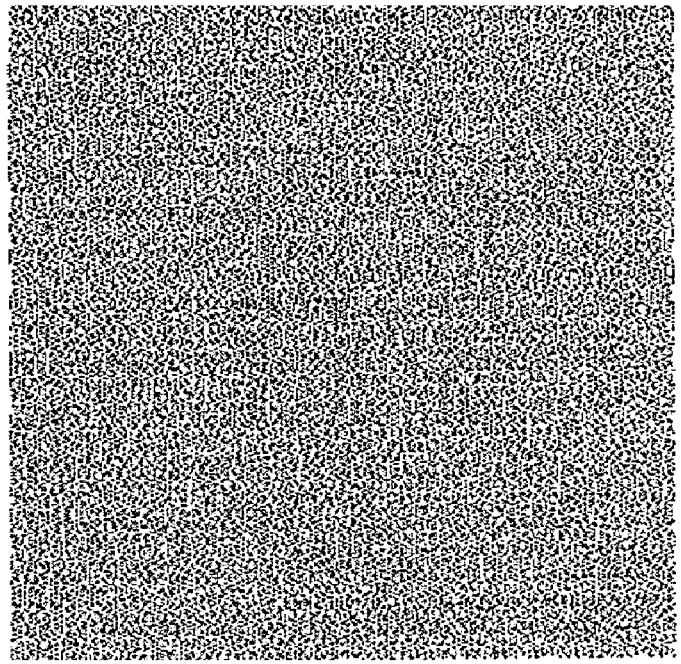
FIGS. 16A and 16B are diagrams illustrating the logical product pattern between the mask C1 in which the block patterns shown in FIG. 12 are considered and the block pattern in FIG. 13B and that between the mask C1 and the block pattern in FIG. 13C, respectively.
Figure 16A:
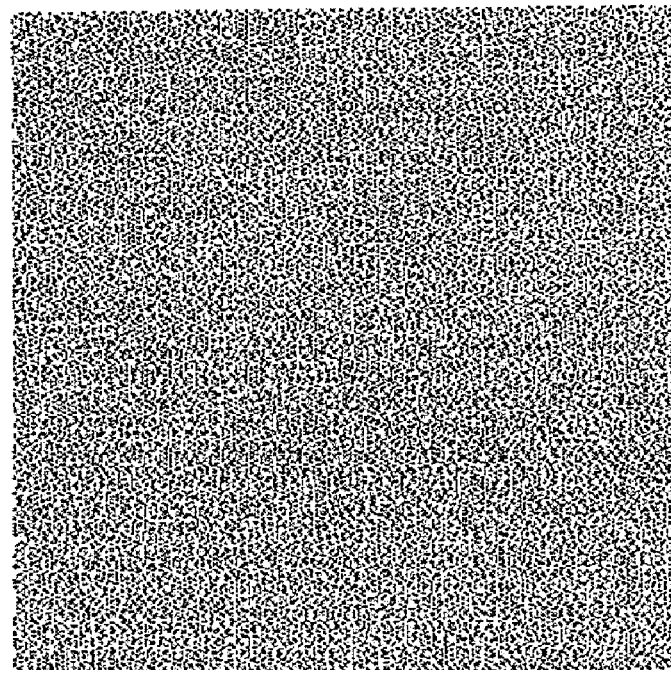

FIGS. 16A and 16B are diagrams illustrating the logical product pattern between the mask C1 created in consideration of the block pattern according to this embodiment shown in FIG. 14 and the block pattern A shown in FIG. 13B and that between the mask C1 and the block pattern B shown in FIG. 13C, respectively. That is, arrangements of dots obtained by allocating dot data (on a solid image) that is subjected to the mask processing with use of the mask C1 shown in FIG. 14 to the nozzle arrays A and B according to the block patterns A and B respectively and then printing the allocated data are illustrated.

Figure 17A:
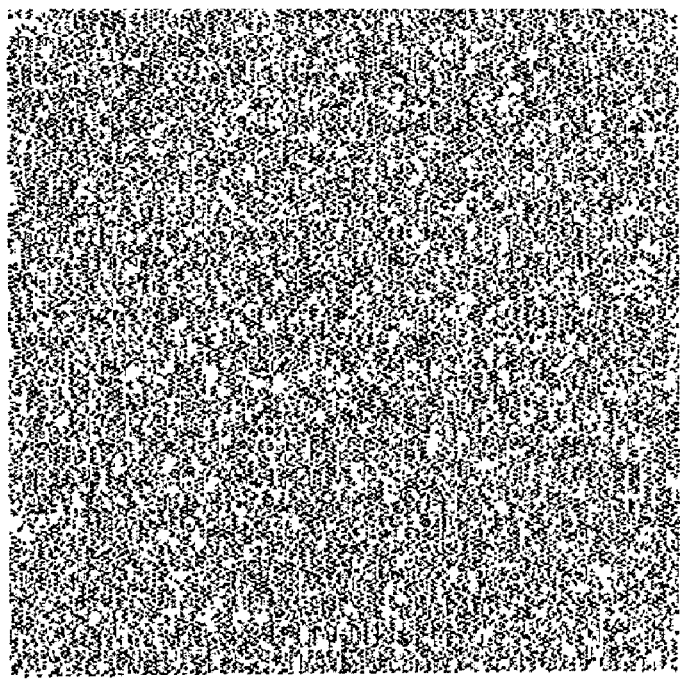
FIGS. 17A and 17B are diagrams illustrating the logical product pattern between the mask C shown in FIG. 15 according to the comparative example and the block pattern in FIG. 13B and that between the mask C and the block pattern in FIG. 13C, respectively.
Figure 17B:
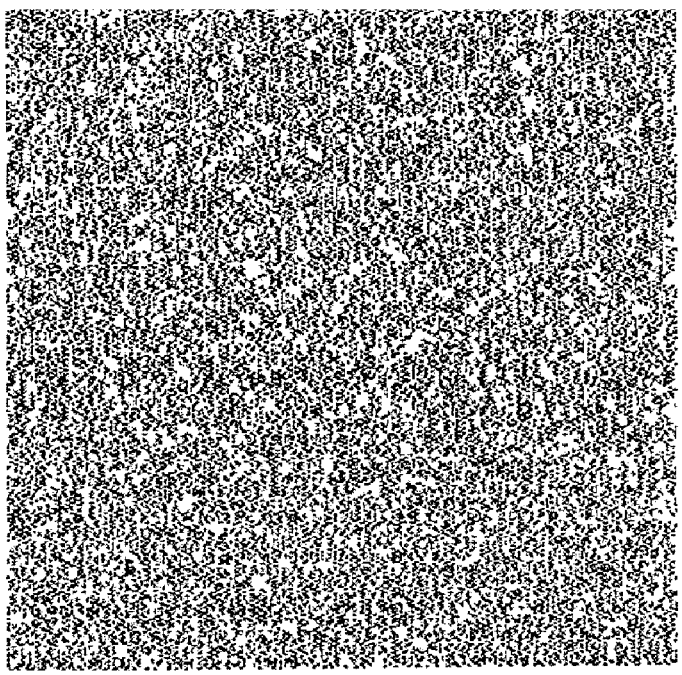

On the other hand, FIGS. 17A and 17B are diagrams illustrating the logical product pattern between the mask in the related application shown in FIG. 15 and the block pattern A and that between also the mask in the related application and the block pattern B, respectively. That is, arrangements of dots obtained by allocating dot data (on a solid image) that is subjected to the mask processing with use of the mask shown in FIG. 15 to the nozzle arrays A and B according to the block patterns A and B respectively and then printing the allocated data are illustrated.

When FIGS. 16A and 16B and FIGS. 17A and 17B are compared, the formers to which the present invention is applied exhibit excellent dispersibilities in the arrangement patterns of printed dots for both of nozzle arrays A and B, from which it turns out that the interference between the mask pattern and each of the block patterns is reduced.

Evaluations Based on Power Spectra

Then, a mask of the present embodiment is evaluated based on power spectra that show frequency characteristics of a mask pattern. The power spectra described below is obtained for the mask pattern having size of 256 areas×256 areas. Here, the power spectra used in this evaluation is "radially averaged power spectrum" described in "T. Mitsa and k. J. Parker, "Digital Halftoning using a Blue Noise Mask", Proc. SPIE 1452, pp. 47-56 (1991)".

Figure 18:
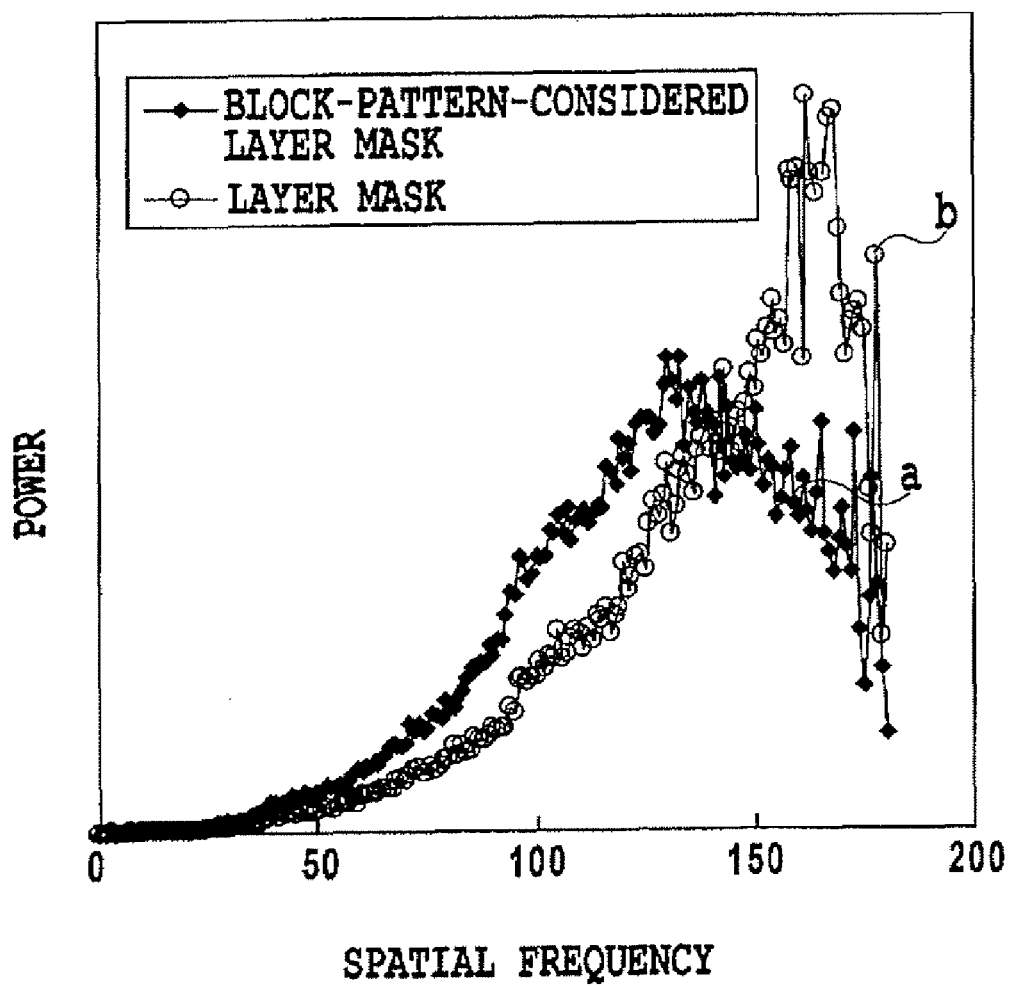
FIG. 18 is a diagram for explaining respective frequency characteristics of the mask shown in FIG. 14 according to Embodiment 1 and the mask shown in FIG. 15 according to the comparative example.

FIG. 18 is a diagram for explaining frequency characteristics of the mask (C1) of this embodiment, in which the block patterns are considered, and the mask of the above-described related application. In FIG. 18, respective curved lines show power spectra of corresponding mask patterns with respect to a spatial frequency. The curved lines a and b show the power spectrum of the mask in this embodiment, in which the block patterns are considered, and that of the mask in the related application, respectively. When these two curved lines are compared with each other, it turns out that the power in the low frequency region to which human vision is sensitive is low in both of the curved lines. That is, the mask in this embodiment, in which the block patterns (driving patterns) are considered, also has few low-frequency components, and provides a pattern characteristic having no peak in the low frequency region.

Figure 19:
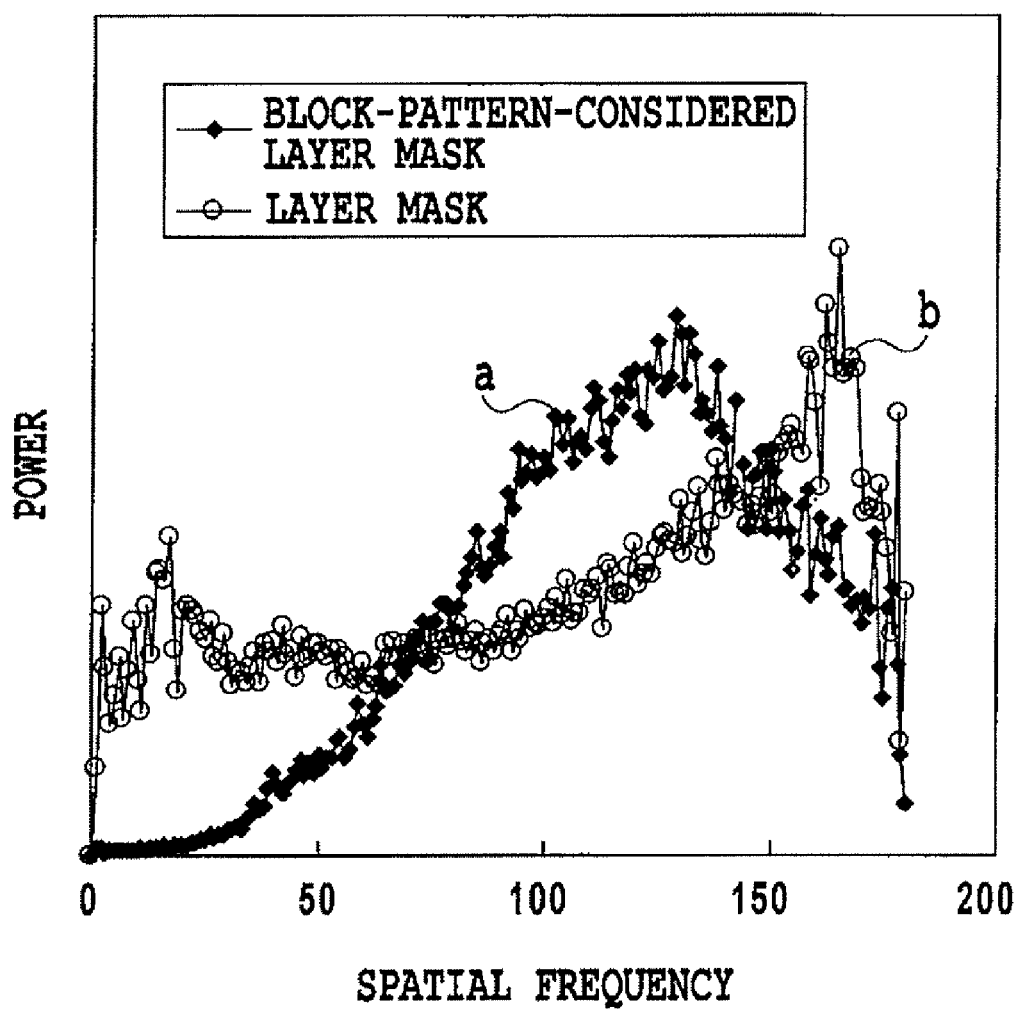
FIG. 19 is a diagram for explaining respective frequency characteristics of the logical product pattern shown in FIG. 16 according to Embodiment 1 and the logical product pattern shown in FIG. 17 according to the comparative example.

FIG. 19 is a diagram for explaining frequency characteristics of the patterns obtained by the logical product of respective patterns of FIG. 18 and the block pattern A of FIG. 13 (the respective logical product patterns shown in FIGS. 16A and 17A). In the diagram, the curved lines a shows power spectra of the logical product of the block pattern-considered mask of this embodiment and the block pattern A shown in FIG. 13 (that is, the logical product pattern shown in FIG. 16A). In other words, the curved line a shows the frequency characteristics of the pattern that shows dot positions which are capable of being printed in one scanning with one nozzle array, in this embodiment that uses the above block pattern-considered mask and the block pattern. On the other hand, the curved lines b shows power spectra of the logical product of the mask of the related application and the block pattern A shown in FIG. 13 (that is, the logical product pattern shown in FIG. 17A).

A term "low frequency component" used in the specification and claims of the present application means a frequency component that exists in a lower frequency side of the middle of a spatial frequency range in which components of frequency (power spectra) exist. On the other hand, a term "high frequency component" means a frequency component that exists in a higher frequency side of the middle of the spatial frequency range. In an example shown in FIG. 19, a border is defined at neighborhood of a spatial frequency "90" in the spatial frequency range, and then a lower frequency side (about 0 to 90) of the border is defined as the "low frequency region" and a higher frequency side (about 91 to 180) of the border is defined as the "high frequency region".

Further, a statement that "the low frequency components are fewer than the high frequency components" means that an integration value of components (low frequency components) that exist in the low frequency region is smaller than the integration value of components (high frequency components) that exist in the high frequency region.

The curved Line b shown in FIG. 19 has a power peak also in the low frequency region and has relatively great amount of the low frequency components. The fact that the power peak exists in the low frequency region means that the mask pattern and the driving pattern (block pattern) interfere with each other so that the arrangement of dots in one scan is biased, and biased arrangement is noticed as a noise.

On the other hand, the curved line a shown in FIG. 19 shows a characteristic that the low frequency components are fewer than the high frequency components, above all a characteristic that the power peaks substantially do not exist in the low frequency region and the low frequency components are relatively few. The fact that the power peak does not exist in the low frequency region means that the mask pattern and the driving pattern hardly ever interfere with each other hardly to cause any the biased arrangement of dots and that the arrangement of dots in one scan is appropriately dispersed.

The characteristics of the curved line a shown in FIG. 19 are described in further detail below. Generally, a human vision has characteristic of a so-called low-pass filter which has a high sensibility to the low frequency components, and the higher frequency, has lower sensibility. Accordingly, it is effective for decreasing of noise feeling to keep the low frequency components as low as possible so that the power peaks of the low frequency components do not exist in whole range of the low frequency region, such as the curved line a.

Among the frequency components in the low frequency region, frequency components which affect the noise feeling is the frequency components existing in a lower side of the middle (half) of the low frequency region, and in a more strict sense, is the frequency components existing in a lower side of one-fourth of the low frequency region. More specifically, the frequency characteristic regarding human vision's sensibility depends on a distance between a human's eye and a printed product. Many documents including for example Dooley's document "R. P. Dooley: Prediction Brightness Appearance at Edge Using and Non-Linear Visual Describing Functions, SPES annual Meeting (1975)" describe the above frequency characteristic. From the various experimentations, it is described that human's eye easily recognizes the components in the lower frequency region than the frequency of about 9 to 10 cycles/mm. In the example shown in FIG. 24, the spatial frequency of "50" corresponds to about 10 cycles/mm and the neighborhood of middle of the low frequency region (the spatial frequency of "45") corresponds to about 9 cycles/mm. Accordingly, a condition that the frequency components are kept to be fewer so that the power peaks do not exist in the frequency region equal to or lower than 9 cycles/mm (that is, in the frequency region that is lower side of the middle (half) of the low frequency region) is effective for decreasing the noise feeling. The curved line b satisfies this condition.

Figure 24:
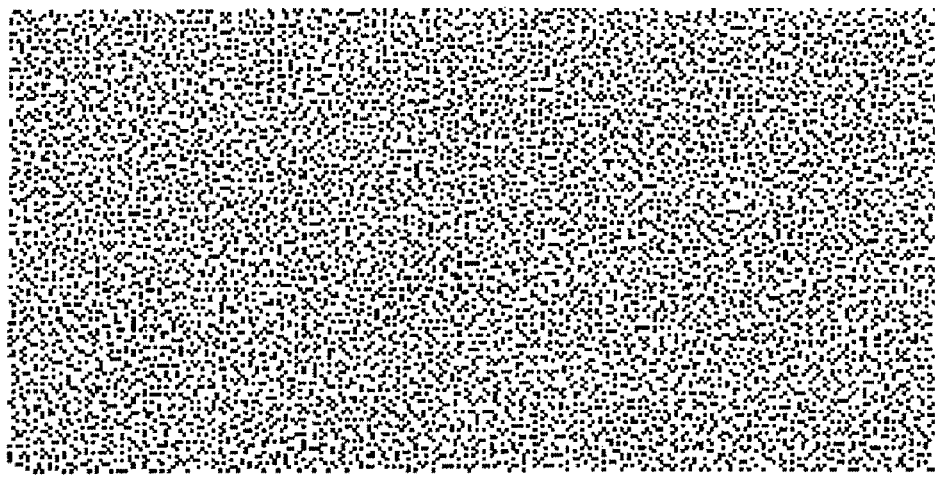
FIG. 24 is a diagram illustrating a mask M1 in which block patterns are considered, according to Embodiment 2.

The spatial frequency becomes lower from 9 cycles/mm, the vision's sensibility gradually becomes higher, and then, the vision's sensibility rapidly increases form the neighborhood of 4.5 cycles/mm (the spatial frequency of "22.5" in FIG. 24). Then, the vision's sensibility takes the maximum at the neighborhood of the 1 to 2 cycles/mm (the spatial frequency of "5 to 10" in FIG. 24). Accordingly, it is important for the frequency components to be kept to be fewer so that the power peaks of the frequency components do not exist in the frequency region (the region lower side of one-fourth of the low frequency region) lower than 4.5 cycles/mm (the spatial frequency of "22.5" in FIG. 24). The curved line b satisfies this condition also.

As described above, according to the present embodiment, as shown in the curved line b of FIG. 24, the low frequency components can be kept to be few to the extend that the power peaks of the frequency components do not exist in the region lower side of one-fourth of the low frequency region (the region lower than about 4.5 cycles/mm). by this, the image with less noise feeling can be obtained. It should be noted that since the curved line b has no power peaks in whole region (the region equal to or less than 9 cycles/mm) lower side of the neighborhood of the half of the low frequency region, the noise feeling is hardly recognized.

As is apparent from the above description, the mask of the embodiments of the present invention has an arrangement of print permitting areas in which the logical product pattern of the arrangement of the print permitting areas and a driving permitting area arrangement of the driving pattern satisfies a characteristic (a) and any of characteristics (b1), (b2) and (b3). It should be noted that, in the present embodiment, it is necessary for the mask to satisfy at least the characteristic (b1) in addition to the characteristic (a). Preferably, the mask of the present embodiment further satisfies the characteristics (b2), and more preferably the mask further satisfies the characteristics (b3).

(a) The frequency components in the low frequency region are fewer than the components in the high frequency region.

(b1) the power peaks do not exist in the region lower side of one-fourth of the low frequency region.

(b2) the power peaks do not exist in the region lower side of half of the low frequency region.

(b3) the power peaks do not exist in whole are of the low frequency region.

Thus, the pattern-considered-type layer mask C1 has the arrangement of the print permitting areas in which the logical product pattern obtained by the logical product of the arrangement of print permitting areas on the mask C1 and the dot arrangement according to the block pattern has characteristics that the low frequency components of the logical product pattern are fewer than the high frequency components thereof and that power peaks of the low frequency components do not exist.

Thus, using the mask in which the block patterns are considered allows arrangement patterns of printed dots to be excellent in dispersibility for both of nozzle arrays A and B, and the interferences between the mask pattern and the block patterns to be reduced. As a result, beading can be reduced. Also, if the distance between the two nozzle arrays is shorter, a larger effect of the present invention can be obtained.

As described above, if a pattern has few low-frequency components in a frequency characteristic of the pattern printed by each nozzle array when dot data is distributed based on block patterns, it turns out that the present invention was applied.

Embodiment 2: 100% Even Mask for Four-pass Printing (Outline of this Embodiment)

A second embodiment of the present invention relates to the multi-pass printing of four-pass in which an image is completed in four times of scanning (twice of reciprocal scanning) by the use of the two nozzle arrays A and B shown in FIG. 13A for ink of each of cyan (C), magenta (M), and yellow (Y). Also, masks to be used for the four-pass printing are those in which block patterns are considered. Regarding each of the masks in this embodiment, the interferences with the block patterns are reduced as in the first embodiment, and also those with the other masks are reduced. This enables the occurrence of beading caused by the aggregation of ink droplets ejected during a plurality of times of scanning to be reduced among others.

In this embodiment, the order of printing is: a first pass of the nozzle array A for cyan,→a first pass of the nozzle array B for cyan,→a first pass of the nozzle array A for magenta,→a first pass of the nozzle array B for magenta,→a first pass of the nozzle array A for yellow,→a first pass of the nozzle array B for yellow,→ . . . ,→a fourth pass of the nozzle array B for cyan,→a fourth pass of the nozzle array A for cyan. Along with this, the order of use of the masks is: C1,→M1,→Y1, →Y2,→M2,→C2,→C3,→M3,→Y3,→Y4,→M4,→C4. In this embodiment, since patterns of the masks are dispersed to each other as described above, an image with high dispersibility of dots formed in process of the scans should be made, whereby the occurrence of the beading is reduced.

(Method of Creating a Mask)

A method for creating a mask according to this embodiment is performed such that print permitting areas are arranged on each of the masks based on the above-described plane-by-plane generation method and sequential arrangement method.

Figure 20:
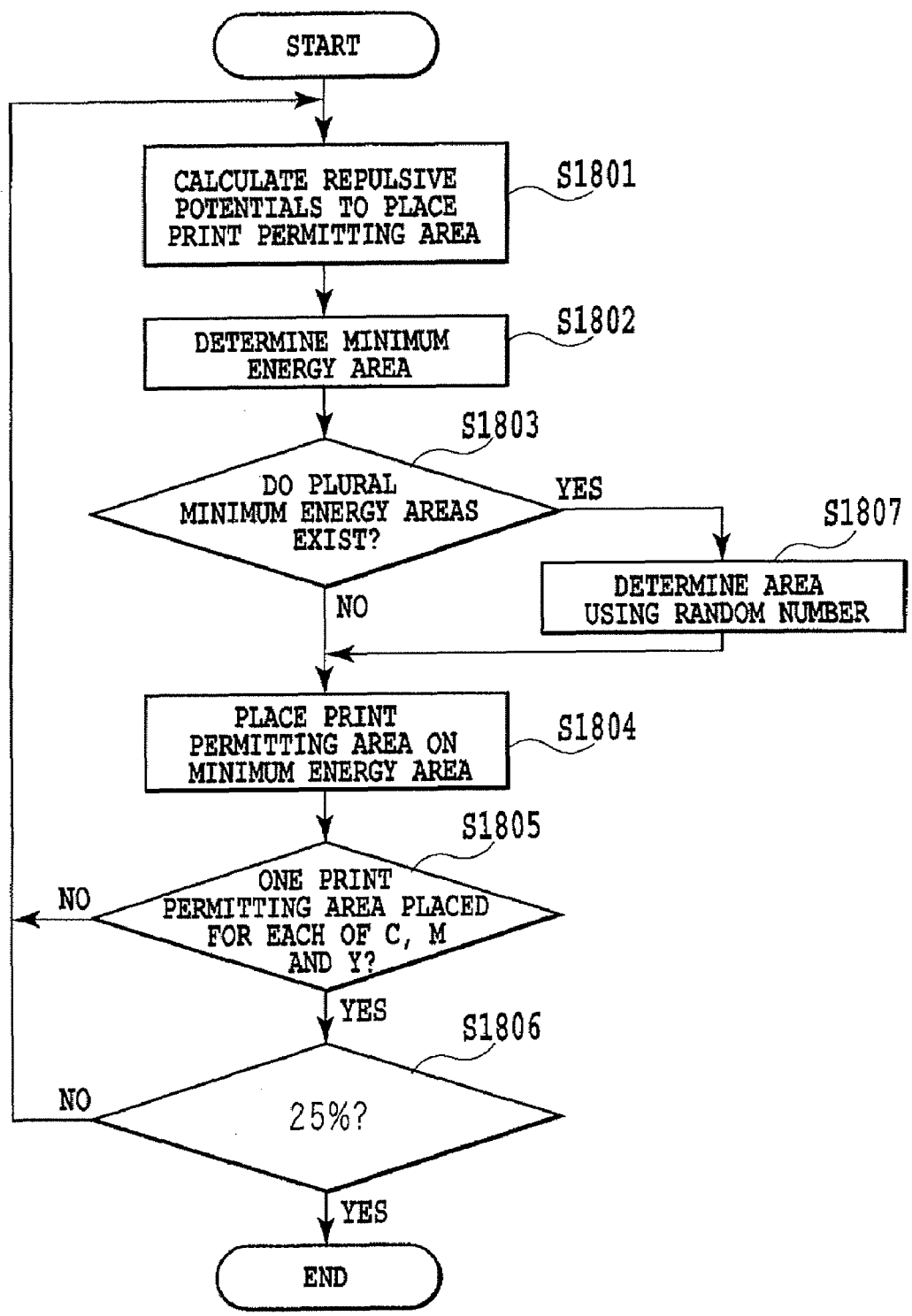
FIG. 20 is a flowchart illustrating an arrangement determination processing of print permitting areas based on the sequential arrangement method according to Embodiment 2.

FIG. 20 is a flowchart illustrating a mask creation processing of this embodiment. A fundamental processing is same as that in the first embodiment described with reference to FIG. 11. Different points are that the masks for which the arrangement are determined are a plurality (C, M and Y) of planes (S1805) and that when an print permitting area which is an object of placing is placed on an area with the lowest repulsive potential, patterns of masks for passes having been created are fixed (S1802). Also, since the masks are for the four-pass printing, it should be appreciated that the above creation processing for each of the colors is repeated for the masks for three passes (C1, C2, C3; Y1, Y2, Y3; M1, M2, M3).

Figure 21:
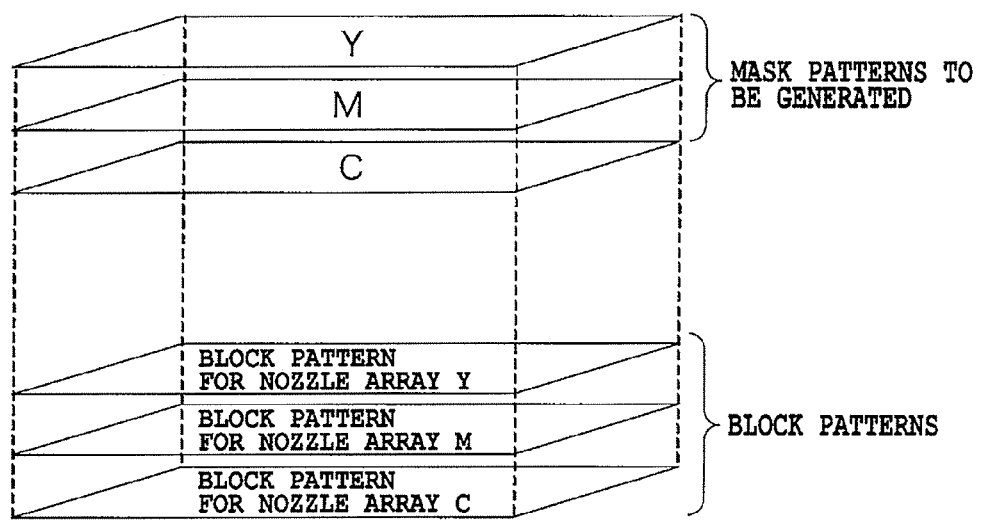
FIG. 21 is a diagram for explaining a concept of a method for creating masks C, M and Y according to Embodiment 2.

For a plurality of masks for which an arrangement should be determined by calculating repulsion, the repulsive potentials are calculated in consideration of block patterns for nozzle arrays of each color when a mask pattern for each color is generated, as shown in FIG. 21. For example, when the mask for the Y plane is generated, the repulsive potentials are calculated between Y plane and the block patterns for the nozzle arrays Y (two nozzle arrays A and B), the M mask plane and the C mask plane, to determine print permitting areas for the Y plane. In addition, to generate a mask for each color, e.g., the Y mask, repulsive potentials may be calculated between Y plane, and all of the combinations including those with the block patterns for the nozzle arrays M and C, in addition to the M plane, the C plane and the block pattern for the nozzle arrays Y. However, this procedure has slightly reduced effect compared with the above-described procedure.

Figure 22:
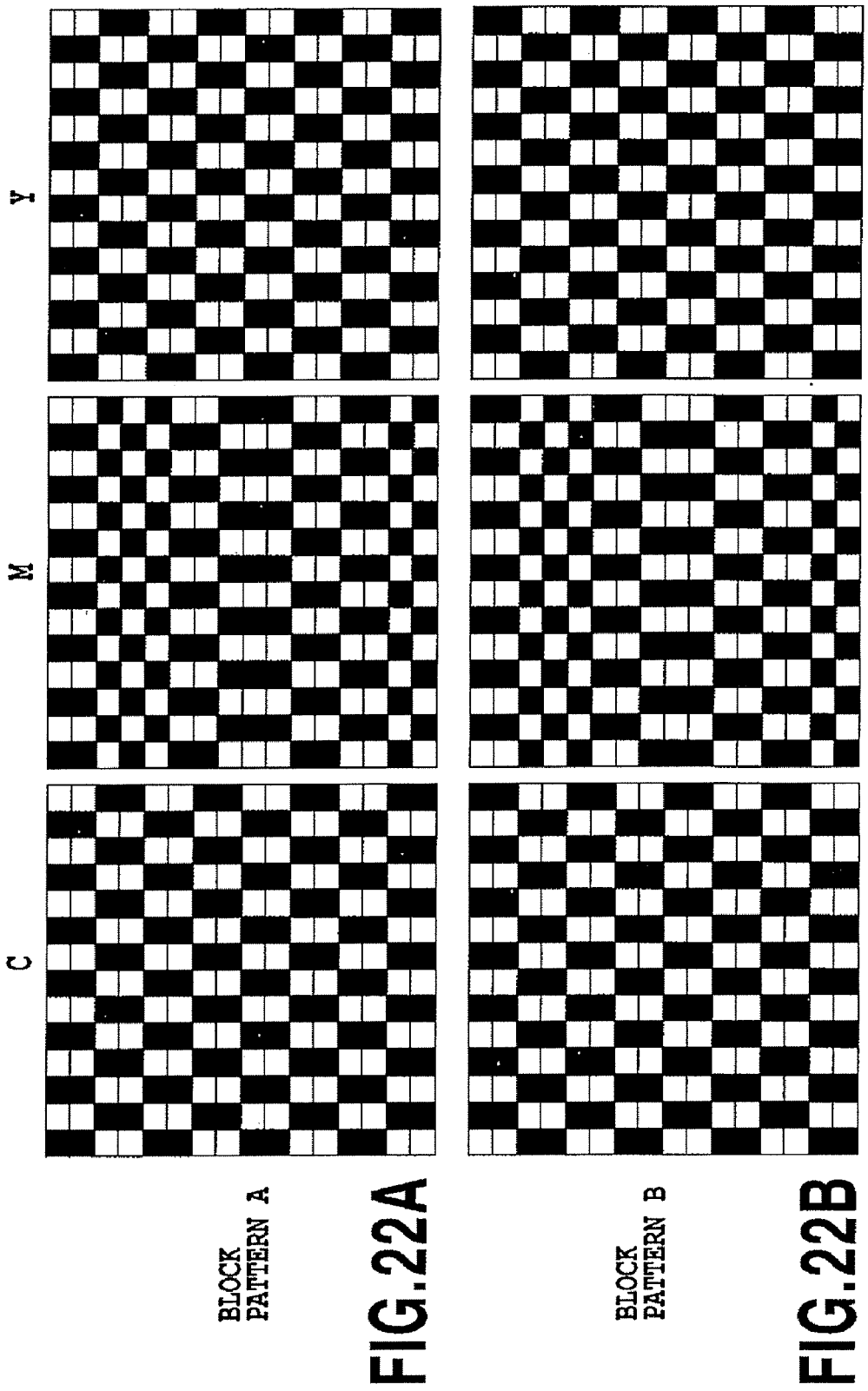
FIGS. 22A and 22B are diagrams illustrating block patterns for each nozzle array according to Embodiment 2.

It should be appreciated that the block patterns to be considered to generate a mask pattern may be the same for inks of different colors, or may be different. FIGS. 22A and 22B are diagrams respectively illustrating the block patterns A and B used in this embodiment. The block patterns for C and Y are same, and that for M is different from them. These block patterns are basic patterns, which are repetitive patterns in the direction of nozzle arrays of a print head correspondingly to the number of nozzles. It should also be appreciated that the patterns are repetitive in the scanning direction of the print head.

(Mask Characteristics Evaluation)

Figure 23:
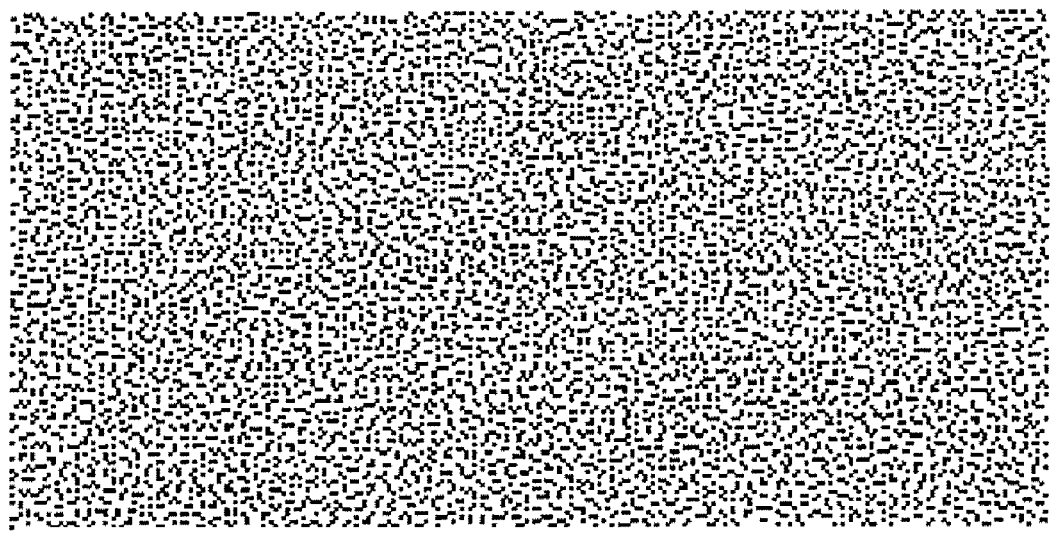
FIG. 23 is a diagram illustrating a mask C1 in which block patterns are considered, according to Embodiment 2.
Figure 25:
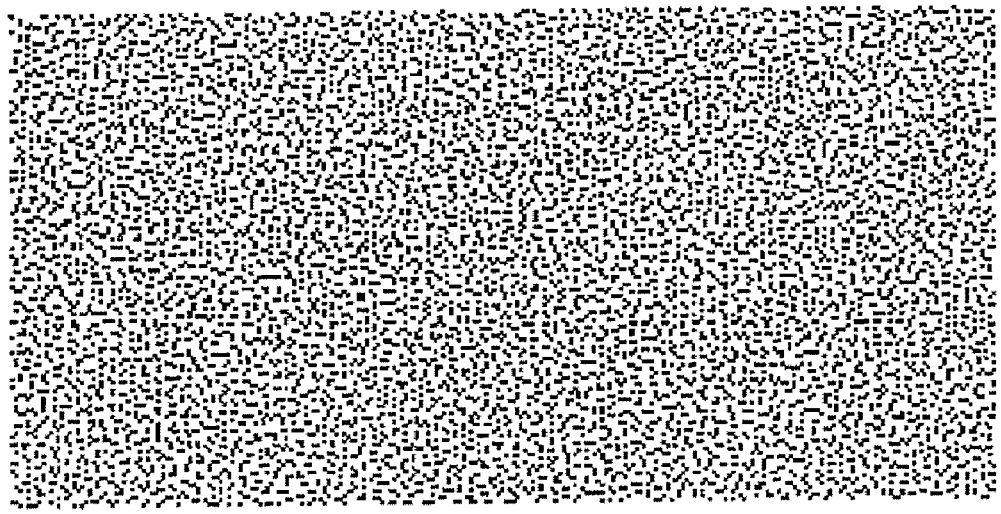
FIG. 25 is a diagram illustrating a mask Y1 in which block patterns are considered, according to Embodiment 2.
Figure 26A:
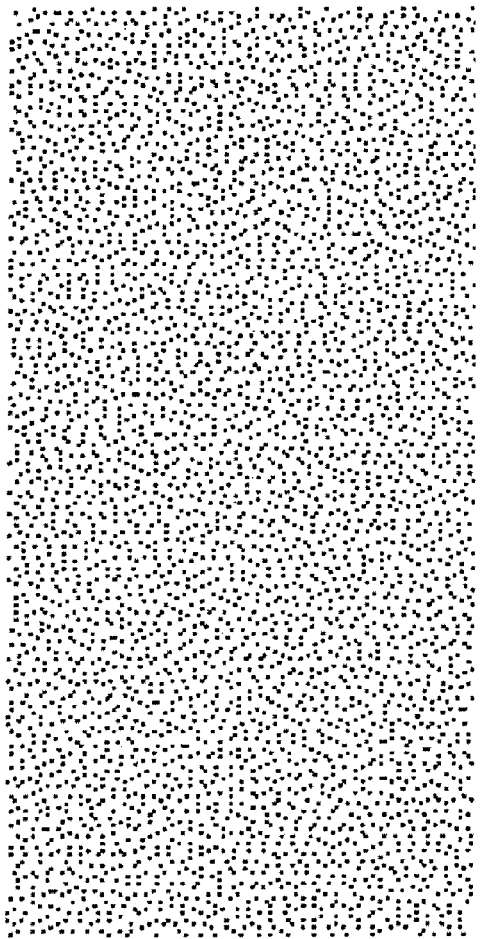
FIGS. 26A and 26B are diagrams illustrating the logical products of the mask C1 and block patterns for cyan, according to Embodiment 2.
Figure 26B:
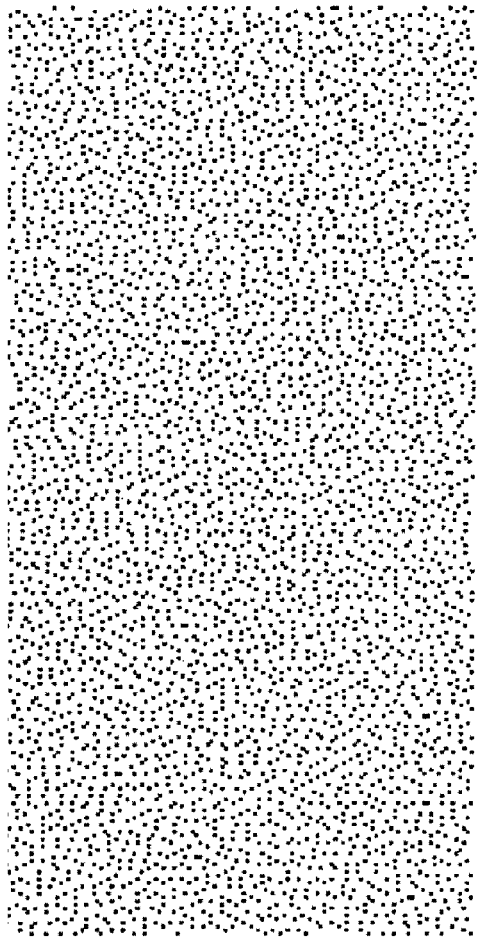
Figure 27A:
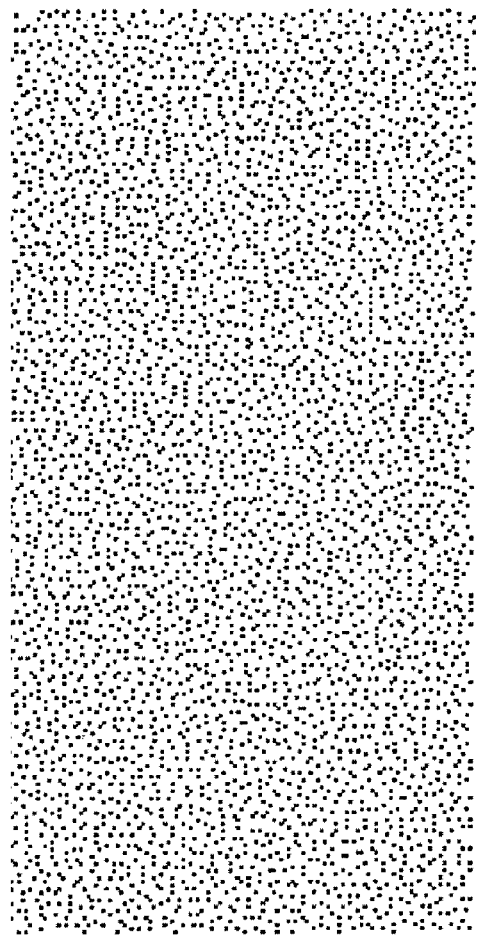
FIGS. 27A and 27B are diagrams illustrating the logical products of the mask M1 and block patterns for magenta, according to Embodiment 2.
Figure 27B:
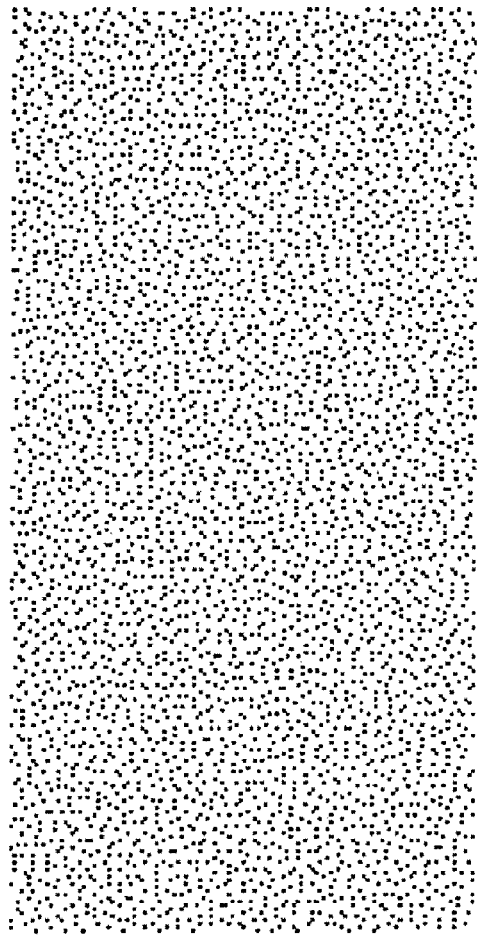
Figure 28A:
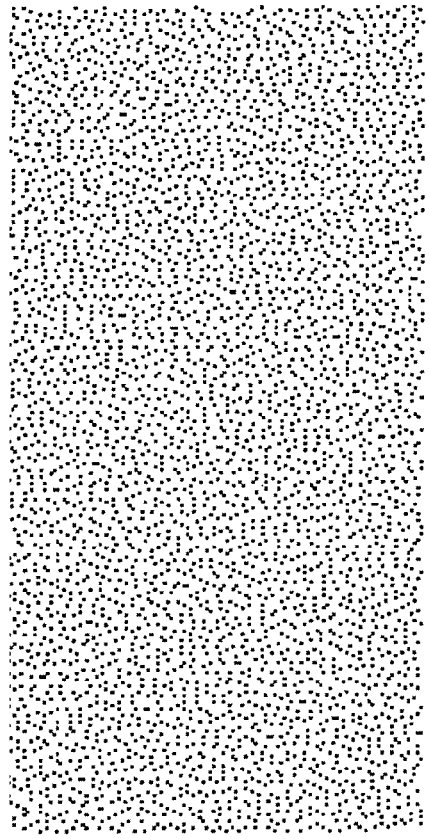
FIGS. 28A and 28B are diagrams illustrating the logical products of the mask Y1 and block patterns for yellow, according to Embodiment 2.
Figure 28B:
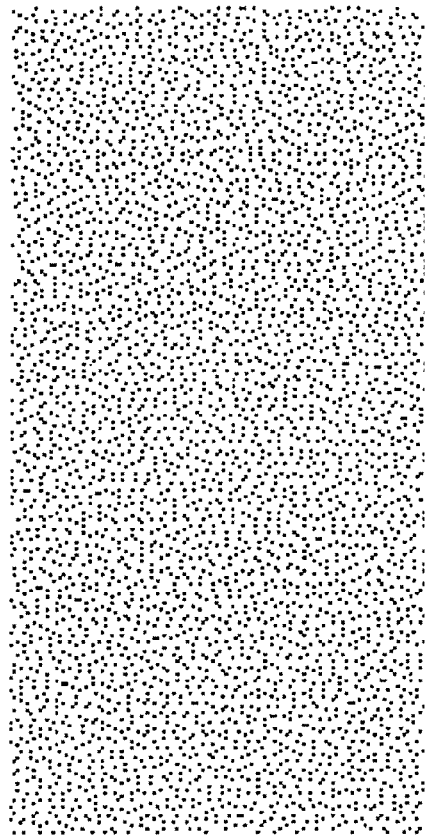

FIGS. 23 to 25 are diagrams respectively illustrating arrangement patterns of print permitting areas in masks C1, M1 and Y1 for one plane according to this embodiment, which are created by the above-described creating method. Each of the mask patterns has a size of 128areas×256 areas. As shown in the diagrams, it turns out that in any of the masks for the plane, the print permitting areas are arranged with good dispersibility.

Each of FIGS. 26A to 28B is a diagram illustrating the logical product between each of the masks C1, M1 and Y1 and each of the corresponding nozzle arrays A and B. That is, FIGS. 26A, 27A and 28A and FIGS. 26B, 27B and 28B show arrangements of dots obtained by respectively driving the nozzle arrays A and B based on the block pattern for each of the colors to thereby print solid images that have been subjected to the mask processing with each of the masks C1, M1 and Y1.

As is obvious from these figures, it turns out that the arrangements of dots printed by driving the respective nozzle arrays A and B based on the block pattern for each of the colors are excellent in dispersiveness. Similarly, dot arrangements for the second and third passes also become improved in dispersiveness.

A frequency characteristic of each of the logical product patterns shown in FIG. 26A to 28B is a pattern in which the low frequency components are fewer than the high frequency components and the peaks substantially do not exist in the low frequency region.

It should be noted that the masks of the Embodiment 2 is not limited to the masks in which the logical product pattern of the mask and the block pattern are that shown in FIGS. 26A to 28B. The mask patterns of the Embodiment 2 may be the mask pattern satisfying following characteristic (a) and any of characteristics (b1), (b2) and (b3), similarly to Embodiment 1. Further, the same is true on Embodiments 3 to 6.

(a) The frequency components in the low frequency region are fewer than the components in the high frequency region.

(b1) the power peaks do not exist in the region lower side of one-fourth of the low frequency region.

(b2) the power peaks do not exist in the region lower side of half of the low frequency region.

(b3) the power peaks do not exist in whole are of the low frequency region.

As described above, according to this embodiment, even in the color four-pass printing, printing with excellent dispersiveness can be performed without the interferences between block patterns and mask patterns and also without uneven distribution of dots printed by each nozzle array.

Embodiment 3: 100% Gradation Mask for Two-pass Printing

A third embodiment of the present invention relates to reducing the interference or increasing dispersibility between a gradation mask and a block pattern in the case of using the gradation mask. Specifically, likewise as above-mentioned embodiments, repulsive potential between the gradation mask of this embodiment and the block pattern is calculated to determine the arrangement of print permitting areas.

A gradation mask has a print ratio (ratio of print permitting areas arranged in a predetermined region) corresponding to nozzle positions. In this embodiment, the number of print permitting areas that meet the print ratio corresponding to each nozzle number is arranged. The planes of block patterns to be considered for calculating repulsive potential are two planes B1 and B2 shown in FIG. 12, likewise as in the first embodiment.

A method for creating masks is basically same as that of the first embodiment, except that in placing the print permitting area on the area with minimum energy, if the number of print permitting areas in a raster including the pixel with minimum energy exceed the number of allocable print permitting areas for that raster, which is determined depending on the print ratio corresponding to each nozzle, the print permitting area is placed on the area with next lowest energy in the raster which has the area with the next lowest energy and is within the limitation of the number of allocable print permitting areas. This enables each raster to have different print ratio and also enables the highly dispersed gradation mask that considers the block pattern to be obtained.

Embodiment 4: 150% Even Mask for Two-pass Printing

The present invention can also be applied to a plurality of masks in which the combined print ratio of the plurality of masks that are complementary each other exceeds 100%. A forth embodiment of the present invention relates to the mask in which two same color planes used for two-pass printing, each having 75% of print ratio, have 150% of print ratio in total.

A method for creating the mask of this embodiment can be performed fundamentally likewise as the first embodiment. This embodiment is different from the first embodiment, in that, after creating the mask pattern of 75% print ratio for first-pass, the mask for second-pass is not created by arranging print permitting areas on the exclusive position. That is, the mask pattern of 75% print ratio for second-pass is also generated by repeating the same processing as that used for the mask for first-pass.

The creation of the mask will now be described in detail, using the sequential arrangement method. Basically, the same processing as that shown in FIG. 11 in accordance with the first embodiment is performed. The processing is different in that the determination process similar to step S905 determines if print permitting areas are arranged up to 75% or not. In addition, as to the creation of the mask for second pass, in the process similar to step S904 shown in FIG. 11, overlapping of printing pixels of different planes of the same color is not prohibited when print permitting areas are arranged. That is, in attempting to place a print permitting area on the position with the lowest energy, even if they overlap the print permitting areas of a different plane of the same color in the position, it is still placed there. This can generate a mask with 150% print ratio exceeding 100% by overlapping of 2 masks.

Embodiment 5: Mask of m×n Cluster Size

A fifth embodiment of the present invention relates to the creation of a cluster mask in which m×n print permitting areas is regarded as one unit. Here, m indicates the number of areas that are consecutive in the main scanning direction; n indicates the number of areas that are consecutive in the sub-scanning direction. The method for creating the mask according to this embodiment is basically performed likewise as in the first embodiment.

Although the mask employing 2 areas×2 areas as one unit was described as an example of a cluster mask employing m areas×n areas as one unit, this embodiment is not limited to the mask employing 2×2 areas. For example, a mask employing 1×2 areas as one unit or a mask employing 2×4 areas as one unit also can be used. As to the values of m and n, both m and n should be positive integers and at least either m or n should be an integer of two or more.

As described above, by considering a block pattern even for the cluster mask case, dots formed by scanning are not unevenly distributed in number and the dispersibility in a pattern is improved. Even if a texture occurs, the improvement of the dispersibility allows the texture to be visually unobtrusive and the adverse effect of the texture on image quality to be suppressed.

Embodiment 6: Mask in which an Index Pattern and a Block Pattern are Both Considered A mask may also be created such that the index patterns shown in FIG. 7 in addition to block patterns are considered and the interferences with these patterns do not occur. A specific method is that the index patterns are considered in a manner similar to that for the block patterns in Embodiment 1.

Further, although two-pass and four-pass printings are described in above-mentioned embodiments, the present invention is not limited to this number of passes. It is apparent from the descriptions of the above embodiments that masks used for the multi-pass printing may be created in considering block patterns for a plurality of nozzle arrays for the same color, regardless of the number of passes.

Furthermore, although a printing device (printer) functions as the data processing apparatus of the present invention and performs mask processing and the related processing in above-mentioned embodiments, it is obvious that the application of the present invention is not limited to this configuration. For example, a data supplying device (for example, the host apparatus shown in FIG. 5 or 6) for supplying binary data generated by mask processing used for each scanning to a printer may function as the data processing apparatus of the present invention and performs mask-processing by using the mask described in above-mentioned embodiments.

Further, the present invention is put into practice by executing program codes of software such as those shown in FIGS. 11 and 20, for example, which are supplied to a computer in an apparatus or a system connected to various devices to operate these devices so as to implement the functions of the above described embodiments, so that the various devices are operated in accordance with the programs stored in the computer (CPU or MPU) of the system or apparatus. In this case, the program codes of the software themselves implement the functions of the above described embodiments, so that the program codes themselves and means for supplying them to the computer, for example, a storage medium storing such program codes constitute the present invention.

The storage medium storing such program codes may be, for example, a floppy disk, a hard disk, an optical disk, a magneto-optical disk, a CD-ROM, a magnetic tape, a non-volatile memory card, or a ROM.

In addition, if the functions of the above described embodiments are implemented not only by the computer by executing the supplied program codes but also through cooperation between the program codes and an OS (Operating System) running in the computer, another application software, or the like, then these program codes are of course embraced in the embodiments of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-108907, filed Apr. 11, 2006, which is hereby incorporated by reference herein in its entirety.

What is claimed is:

1. A data processing apparatus, said apparatus comprising:
   means for executing mask processing by using mask patterns for image data of a predetermined color to be printed to a same region of a printing medium by a plurality of nozzle arrays for printing dots of the predetermined color, in order to divide the image data into divided image data used for printing in each of the plurality times of scanning of the plurality of nozzle arrays to the same region; and
   means for allocating the divided image data that has been subjected to the mask processing to the plurality of nozzle arrays in accordance with respective driving patterns for respective nozzle arrays, the respective driving patterns having driving permitting areas and driving non-permitting areas,
   wherein the mask pattern has a characteristic that frequency components of a low frequency region in a logical product pattern, which is obtained by a logical product operation of an arrangement of the print permitting areas in the mask pattern and an arrangement of driving permitting areas in the driving pattern for each of the plurality of nozzle arrays, are fewer than that of a high frequency region, and peaks of the frequency components do not exist in a region lower side of half of the low frequency region.

2. A data processing apparatus as claimed in claim 1, wherein the mask patterns are respective mask patterns used for three or more times of scanning for the predetermined color, and
   frequency components of the low frequency component region in logical product patterns, which are obtained by logical products of respective arrangement patterns of the print permitting areas of the mask patterns used for the three or more times of scanning, are fewer than that of the high frequency component region.

3. A data processing apparatus as claimed in claim 1, wherein ratios of the print permitting areas of the mask pattern have bias along an arrangement direction of nozzles in each of the plurality of nozzle arrays in the print head.

4. A data processing apparatus as claimed in claim 1, wherein the plurality of the mask patterns used for the plurality times of scanning by which printing to the same region is performed has respective print permitting areas in which total of the ratios of the print permitting areas is greater than 100%.

5. A data processing apparatus as claimed in claim 1, wherein the mask pattern has the arrangement of the print permitting areas in which m areas x n areas are arranged as a unit of arrangement of the print permitting areas.

6. A data processing apparatus as claimed in claim 1, further comprising a memory for storing the mask patterns,
   wherein said mask processing means executes a logical product operation using the mask patterns read from said memory and the image data to generate divided image data used for each of the plurality times of scanning.

7. A data processing apparatus as claimed in claim 1, wherein said data processing apparatus is a printing apparatus that performs printing based on the allocated image data allocated according to the driving patterns.

8. A data processing apparatus as claimed in claim 1, wherein said data processing apparatus is a data supply apparatus that supplies the image data allocated according to the driving patterns to a printing apparatus that performs printing based on the allocated image data allocated according to the driving patterns.

9. A data processing apparatus as claimed in claim 1, wherein at least one of the mask patterns is an aperiodic pattern.

10. A data processing apparatus, said apparatus comprising:
    means for executing mask processing by using mask patterns for image data of a predetermined color to be printed to a same region of a printing medium by a plurality of nozzle arrays for printing dots of the predetermined color, in order to divide the image data into divided image data used for printing in each of the plurality times of scanning of the plurality of nozzle arrays to the same region; and
    means for allocating the divided image data that has been subjected to the mask processing to the plurality of nozzle arrays in accordance with respective driving patterns for respective nozzle arrays, the respective driving patterns having driving permitting areas and driving non-permitting areas,
    wherein the mask pattern has a characteristic that frequency components of a low frequency region in a logical product pattern, which is obtained by a logical product operation of an arrangement pattern of print permitting areas in at least one of the mask patterns and each arrangement pattern of driving permitting areas in the respective driving patterns, are fewer than that of a high frequency region, and peaks of the frequency components do not exist in a region lower side of one-fourth of the low frequency region.

11. A data processing apparatus, said apparatus comprising:
    means for executing mask processing by using mask patterns for image data of a predetermined color to be printed to a same region of a printing medium by a plurality of nozzle arrays for printing dots of the predetermined color, in order to divide the image data into divided image data used for printing in each of the plurality times of scanning of the plurality of nozzle arrays to the same region; and
    means for allocating the divided image data that has been subjected to the mask processing to the plurality of nozzle arrays in accordance with respective driving patterns for respective nozzle arrays, the respective driving patterns having driving permitting areas and driving non-permitting areas, wherein the mask pattern has a characteristic that frequency components of a low frequency region in a logical product pattern, which is obtained by a logical product operation of an arrangement pattern of print permitting areas in at least one of the mask patterns and each arrangement pattern of driving permitting areas in the respective driving patterns, are fewer than that of a high frequency region, and peaks of the frequency components do not exist in a whole area of the low frequency region.

12. A data processing apparatus, said apparatus comprising:

means for executing mask processing by using mask patterns corresponding to a plurality of colors for image data of each of the plurality of colors to be printed to a same region of a printing medium by a plurality of nozzle arrays for printing dots of the plurality of colors, in order to divide, for each of the plurality of colors, the image data into divided image data used for printing in each of the plurality times of scanning of the plurality of nozzle arrays to the same region; and means for allocating, for each of the plurality of colors, the divided image data that has been subjected to the mask processing to the nozzle arrays in accordance with respective driving patterns for respective nozzle arrays, the respective driving patterns having driving permitting areas and driving non-permitting areas, wherein the mask pattern has a characteristic that frequency components of a low frequency region in a logical product pattern, which is obtained by a logical product operation of an arrangement pattern of print permitting areas in at least one of the mask patterns and each arrangement pattern of driving permitting areas in the respective driving patterns, are fewer than that of a high frequency region, and peaks of the frequency components do not exist in a whole area of the low frequency region, and wherein frequency components of the low frequency component region in logical product patterns, which are obtained by logical products of respective arrangement patterns of the print permitting areas of the mask patterns for the plurality of colors, are fewer than that of the high frequency component region.

13. A printing apparatus that performs printing by a plurality times of scanning of a plurality of nozzle arrays for printing dots of a predetermined color, relative to a same region of a printing medium, said apparatus comprising:

means for executing mask processing for image data of the predetermined color to be printed to the same region by using mask patterns, in order to divide the image data into divided image data used for each of the plurality times of scanning; and means for allocating the divided image data that has been subjected to the mask processing to the plurality of nozzle arrays in accordance with respective driving patterns for respective nozzle arrays, the respective driving patterns having driving permitting areas and driving non-permitting areas, wherein the mask pattern has a characteristic that frequency components of a low frequency region in a logical product pattern, which is obtained by a logical product operation of an arrangement pattern of print permitting areas in at least one of the mask patterns and each arrangement pattern of driving permitting areas in the respective driving patterns, are fewer than that of a high frequency region, and peaks of the frequency components do not exist in a region lower side of half of the low frequency region.

14. A printing apparatus as claimed in claim 13, wherein at least one of the mask patterns is an aperiodic pattern.

15. A method of creating mask patterns used in mask processing in a data processing apparatus that divides image data to be printed to a same region of a printing medium by a plurality of nozzle arrays for printing dots of the predetermined color, by using mask patterns, into divided image data used for printing in each of the plurality times of scanning of the plurality of nozzle arrays to the same region, and allocates the divided image data to the plurality of nozzle arrays in accordance with respective driving patterns for respective nozzle arrays, the respective driving patterns having driving permitting areas and driving non-permitting areas, said method comprising:

a determining step of determining an arrangement of print permitting areas in the mask pattern, wherein said determining step includes a step of determining the arrangement of print permitting areas so that a logical product pattern obtained by a logical product operation of a pattern indicative of the arrangement of the print permitting areas in the mask pattern and each arrangement pattern of driving permitting areas in each of the driving patterns has a characteristic that low frequency components of the logical product pattern are decreased.

16. A method as claimed in claim 15, wherein said determining step determines the arrangement of the print permitting areas in the mask pattern based on a repulsive potential calculated between the arrangement of the print permitting areas and the arrangement of driving permitting areas in each of the driving patterns for each of nozzle arrays.

17. A method as claimed in claim 16, wherein said determining step includes a first step of, when placing the print permitting area on a position of the mask pattern, calculating the repulsive potential among the print permitting area to be placed on the position, other print permitting areas and the driving permitting areas arranged in the driving patterns;

a second step of placing the print permitting areas, each of which has been subjected to the repulsive potential calculation, on a position at which the repulsive potential is minimum; and a third step of repeating said first and second steps to place a number of print permitting areas which corresponds to print ratio of the mask pattern.

18. A data processing method, said method comprising:

a step of executing mask processing by using mask patterns for image data of a predetermined color to be printed to the same region of a printing medium by a plurality of nozzle arrays for printing dots of the predetermined color, in order to divide the image data into divided image data used for printing in each of the plurality times of scanning of the plurality of nozzle arrays to the same region; and a step of allocating the divided image data that has been subjected to the mask processing to the plurality of nozzle arrays in accordance with respective driving patterns for respective nozzle arrays, the respective driving patterns having driving permitting areas and driving non-permitting areas, wherein the mask pattern has a characteristic that frequency components of a low frequency region in a logical product pattern, which is obtained by a logical product operation of an arrangement pattern of print permitting areas in at least one of the mask patterns and each arrangement pattern of driving permitting areas in the respective driving patterns, are fewer than that of a high frequency region, and peaks of the frequency components do not exist in a region lower side of half of the low frequency region.

19. A data processing method, said method comprising:
a step of executing mask processing by using mask patterns for image data of a predetermined color to be printed to a same region of a printing medium by a plurality of nozzle arrays for printing dots of the predetermined color, in order to divide the image data into divided image data used for printing in each of the plurality times of scanning of the plurality of nozzle arrays to the same region; and
a step of allocating the divided image data that has been subjected to the mask processing to the plurality of nozzle arrays in accordance with respective driving patterns for respective nozzle arrays, the respective driving patterns having driving permitting areas and driving non-permitting areas,
wherein the mask pattern has a characteristic that frequency components of a low frequency region in a logical product pattern, which is obtained by a logical product operation of an arrangement pattern of print permitting areas in at least one of the mask patterns and each arrangement pattern of driving permitting areas in the respective driving patterns, are fewer than that of a high frequency region, and peaks of the frequency components do not exist in a region lower side of one-fourth of the low frequency region.

20. A data processing method, said method comprising:
a step of executing mask processing by using mask patterns for image data of a predetermined color to be printed to the same region of a printing medium by a plurality of nozzle arrays for printing dots of the predetermined color, in order to divide the image data into divided image data used for printing in each of the plurality times of scanning of the plurality of nozzle arrays to the same region; and
a step of allocating the divided image data that has been subjected to the mask processing to the plurality of nozzle arrays in accordance with respective driving patterns for respective nozzle arrays, the respective driving patterns having driving permitting areas and driving non-permitting areas,
wherein the mask pattern has a characteristic that frequency components of a low frequency region in a logical product pattern, which is obtained by a logical product operation of an arrangement pattern of print permitting areas in at least one of the mask patterns and each arrangement pattern of driving permitting areas in the respective driving patterns, are fewer than that of a high frequency region, and peaks of the frequency components do not exist in a whole area of the low frequency region.

* * * * *